United States Patent
Cox

(10) Patent No.: US 9,481,794 B2
(45) Date of Patent: Nov. 1, 2016

(54) ASPHALT BINDERS CONTAINING A GLYCERIDE AND FATTY ACID MIXTURE AND METHODS FOR MAKING AND USING SAME

(71) Applicant: Flint Hills Resources, LP, Wichita, KS (US)

(72) Inventor: Brian Russell Cox, Burnsville, MN (US)

(73) Assignee: Flint Hills Resources, LP, Wichita, KS (US)

( * ) Notice: Subject to any disclaimer, the term of this patent is extended or adjusted under 35 U.S.C. 154(b) by 0 days.

(21) Appl. No.: 14/931,210

(22) Filed: Nov. 3, 2015

(65) Prior Publication Data

US 2016/0122507 A1     May 5, 2016

Related U.S. Application Data

(60) Provisional application No. 62/074,526, filed on Nov. 3, 2014.

(51) Int. Cl.

| | |
|---|---|
| *C08L 95/00* | (2006.01) |
| *C08K 5/103* | (2006.01) |
| *C08K 5/09* | (2006.01) |
| *C08K 5/05* | (2006.01) |
| *C08K 5/01* | (2006.01) |
| *C08K 5/00* | (2006.01) |
| *C08K 3/00* | (2006.01) |
| *C08K 3/06* | (2006.01) |

(52) U.S. Cl.
CPC .............. *C08L 95/00* (2013.01); *C08K 3/0008* (2013.01); *C08K 3/0033* (2013.01); *C08K 3/06* (2013.01); *C08K 5/0008* (2013.01); *C08K 5/01* (2013.01); *C08K 5/05* (2013.01); *C08K 5/09* (2013.01); *C08K 5/103* (2013.01); *C08L 2555/52* (2013.01); *C08L 2555/54* (2013.01); *C08L 2555/60* (2013.01); *C08L 2555/62* (2013.01); *C08L 2555/74* (2013.01); *C08L 2555/84* (2013.01)

(58) Field of Classification Search
CPC .... C08K 3/0008; C08K 3/0033; C08K 3/06; C09K 5/0008; C09K 5/103; C09K 5/01; C09K 5/05; C09K 5/09; C08L 95/00; C08L 2555/40; C08L 2555/52; C08L 2555/54; C08L 2555/60; C08L 2555/62; C08L 2555/74; C08L 2555/84; C09D 195/00; C10C 3/00

See application file for complete search history.

(56) References Cited

U.S. PATENT DOCUMENTS

| | | | |
|---|---|---|---|
| 5,164,002 A * | 11/1992 | Ballenger, Jr. .......... | C08L 95/00 106/246 |
| 5,711,796 A | 1/1998 | Grzybowski et al. | |
| 7,495,045 B2 | 2/2009 | Buras et al. | |
| 8,088,210 B2 | 1/2012 | Crews et al. | |
| 2005/0145137 A1 | 7/2005 | Buras et al. | |
| 2008/0250975 A1 * | 10/2008 | Deneuvillers ............. | C09F 5/08 106/246 |
| 2009/0090658 A1 | 4/2009 | Burkus et al. | |
| 2009/0137705 A1 | 5/2009 | Faucon Dumont et al. | |
| 2012/0060722 A1 | 3/2012 | Montpeyroux et al. | |
| 2012/0252938 A1 | 10/2012 | Des Jarlais et al. | |

FOREIGN PATENT DOCUMENTS

| | | |
|---|---|---|
| WO | 97/35940 | 10/1997 |
| WO | 2010/072832 | 7/2010 |
| WO | 2012/169891 | 12/2012 |
| WO | 2014/005935 | 1/2014 |

OTHER PUBLICATIONS

Akoh, Casimir C. Lai, Oi-Ming. (2005). Healthful Lipids—29.1.3 Production of Stanol Esters. AOCS Press. Online version available at: http://app.knovel.com/hotlink/pdf/id:kt0068P8Q2/healthful-lipids/production-stanol-esters.*
PCT/US2015/058778, International Search Report and Written Opinion dated Dec. 28, 2015.

* cited by examiner

*Primary Examiner* — Pegah Parvini
*Assistant Examiner* — Alexandra M Moore
(74) *Attorney, Agent, or Firm* — Edmonds & Cmaidalka

(57) ABSTRACT

Asphalt binders and methods for making and using same. In at least one specific embodiment, the asphalt binder can include a bitumen and a glyceride and fatty acid mixture. The glyceride and fatty acid mixture can include one or more triglycerides, at least 1 wt % of one or more diglycerides, and at least 5 wt % of one or more fatty acids, based on the combined weight of the one or more triglycerides, the one or more diglycerides, and the one or more fatty acids. The asphalt binder can be made by combining a bitumen and a glyceride and fatty acid mixture. A paving composition can be made by combining a plurality of solids and the asphalt binder. A road can include a plurality of solids mixed with the asphalt binder.

26 Claims, No Drawings

ASPHALT BINDERS CONTAINING A GLYCERIDE AND FATTY ACID MIXTURE AND METHODS FOR MAKING AND USING SAME

CROSS-REFERENCE TO RELATED APPLICATION

This application claims priority to U.S. Provisional Patent Application No. 62/074,526, filed on Nov. 3, 2014, which is incorporated by reference herein.

BACKGROUND

1. Field

Embodiments described generally relate to asphalt binders and methods for making and using same. More particularly, such embodiments relate to asphalt binders containing a glyceride and fatty acid mixture and methods for making and using same.

2. Description of the Related Art

Asphalt binders are added to solids or particulates, e.g., aggregate, to form a hot mix asphalt that can be used for paving roads. The asphalt binder acts as a glue or adhesive that binds the aggregate together. Fluctuating temperatures can adversely affect asphalt roads. For example, hot temperatures can cause the modulus or stiffness of the asphalt road to decrease, causing ruts in the road. Cold temperatures can cause the flexibility of the asphalt road to decrease, causing cracks in the road. And as the temperature of the road decreases, the asphalt can shrink, causing the road to crack due to the stresses in the asphalt exceeding its critical tensile strength.

Generally, asphalt binders are produced in a refinery by distilling petroleum crude in a vacuum distillation tower until the desired paving grade material is obtained. Given the large supply of heavy sour crudes and changing economics favoring fuel production, it is now common to produce a hard, low penetration bitumen in the vacuum distillation tower or through a separate solvent deasphalting process, and then blend with a hydrocarbon oil derived from crude oil distillate, e.g., gas oil, to soften the bitumen to provide a paving grade asphalt. While the use of hydrocarbon oils improve the performance properties of asphalt binders, hydrocarbon oils are expensive and can lead to asphalt binders that are unsatisfactorily susceptible to rutting and/or cracking.

There is a need, therefore, for improved asphalt binders and methods for making and using same.

SUMMARY

Asphalt binders and methods for making and using same are provided. In at least one specific embodiment, the asphalt binder can include a bitumen and a glyceride and fatty acid mixture. The glyceride and fatty acid mixture can include one or more triglycerides, at least 1 wt % of one or more diglycerides, and at least 5 wt % of one or more fatty acids, based on the combined weight of the one or more triglycerides, diglycerides, and fatty acids.

In at least one specific embodiment, the method for making an asphalt binder can include combining a bitumen and a glyceride and fatty acid mixture to produce the asphalt binder. The glyceride and fatty acid mixture can include one or more triglycerides, at least 1 wt % of one or more diglycerides, and at least 5 wt % of one or more fatty acids, based on the combined weight of the one or more triglycerides, diglycerides, and fatty acids.

In at least one specific embodiment, a method for making a paving composition can include combining a plurality of solids with the asphalt binder to produce the paving composition. And in at least one specific embodiment, a road can include a plurality of solids mixed with the asphalt binder.

DETAILED DESCRIPTION

An asphalt binder can include, but is not limited to, one or more bitumens and a mixture of one or more glycerides and one or more fatty acids. Illustrative glycerides can include, but are not limited to, diglycerides, triglycerides, or a mixture thereof. As such, the mixture of one or more glycerides and one or more fatty acids can include, but is not limited to, one or more triglycerides, one or more diglycerides, and one or more fatty acids. The one or more fatty acids in the mixture of one or more glycerides and one or more fatty acids can be free fatty acids. The mixture of one or more glycerides and one or more fatty acids can also be referred to as a "glyceride and fatty acid mixture." The mixture of one or more glycerides and one or more fatty acids can also include, but is not limited to, one or more phytosterols, one or more phospholipids, one or more tocopherols, one or more hydroxycinnamate steryl esters, one or more carotenoids, one or more tocotrienols, or any mixture thereof. The asphalt binder can also include, but is not limited to, one or more additives. Illustrative additives can include, but are not limited to, one or more hydrocarbon oils, one or more polymers, one or more acids, one or more hydrogen sulfide scavengers, one or more antistrips, or any mixture thereof.

It has been surprisingly and unexpectedly discovered that the mixture of one or more glycerides and one or more fatty acids can be used to replace at least a portion of a hydrocarbon oil in an asphalt binder that includes a mixture or blend of bitumen and a hydrocarbon oil to produce an asphalt binder having one or more improved properties. For example, the mixture of one or more glycerides and one or more fatty acids can replace at least a portion of a hydrocarbon oil component in an asphalt binder to produce an asphalt binder having improved deformation resistance properties relative to a comparative asphalt binder that does not include the mixture of one or more glycerides and one or more fatty acids replacing at least a portion of the hydrocarbon oil. Additionally, a resistance to cracking, e.g., transverse cracking and age-induced surface cracking, can be enhanced such that pavement life should be significantly increased. Although crack-prediction can be largely determined from the rheological properties of the asphalt binder, other performance properties can be better evaluated by mixing the asphalt with an aggregate. Therefore, in another example, the mixture of one or more glycerides and one or more fatty acids can replace at least a portion of a hydrocarbon oil component in an asphalt binder to produce an asphalt binder that can be used in a paving composition, e.g., mixed with a plurality of solids. The paving composition that includes the asphalt binder containing the mixture of one or more glycerides and one or more fatty acids not only can exhibit improved rutting resistance, but can also have an improved resistance to moisture susceptibility and/or a reduction in air voids in the paving composition at a constant compaction relative to a comparative paving composition that does not include the mixture of one or more glycerides and one or more fatty acids replacing at least a portion of the hydrocarbon oil. Better compaction is widely known to deliver less permanent deformation, less moisture damage, less oxidation, and longer pavement life. By improving the resistance to moisture susceptibility the use of conventional additives such as anti-stripping chemicals that can be added to the asphalt binder to improve resistance to moisture susceptibility can be significantly reduced or even eliminated.

In one or more embodiments, the mixture of one or more glycerides and one or more fatty acids can be recovered as a product during the production of ethanol from corn. For example, ethanol can be produced from corn utilizing a dry milling process in which the corn kennel is ground into flour and mixed with water. Starch can be converted to sugar by adding enzymes to the aqueous flour mixture. The sugar can be converted to ethanol by adding yeast. The product or stillage, also referred to as wash, meal, beer mash, or sour mash, can be distilled to separate the ethanol therefrom. The non-fermentable parts can also be separated. Solids can be combined into a feed co-product referred to as distillers dried grain with solubles (DDGS). The mixture of one or more glycerides and one or more fatty acids can be recovered from a liquid portion referred to as the thin stillage, which can contain some solids, and/or the DDGS. Accordingly, one mixture of one or more glycerides and one or more fatty acids can be or include what is generally referred to as post-fermentation distillers corn oil. Another mixture of one or more glycerides and one or more fatty acids can be or include a mixture made by combining one or more triglycerides and/or one or more diglycerides and one or more fatty acids with one another, where the triglycerides, diglycerides, and fatty acids can be independently derived from any source or combination of sources. Another suitable mixture of one or more glycerides and one or more fatty acids can be or include a mixture made by combining one or more triglycerides, one or more diglycerides, and one or more fatty acids with one another, where the triglycerides, diglycerides, and fatty acids can be independently derived from any source or combination of sources.

The mixture of one or more glycerides and one or more fatty acids can include at least 5 wt %, at least 7 wt %, at least 9 wt %, at least 10 wt %, at least 10.5 wt %, at least 11 wt %, at least 11.5 wt %, at least 12 wt %, at least 12.5 wt %, or at least 13 wt % of the one or more fatty acids, based on the combined weight of the one or more triglycerides, the one or more diglycerides, and the one or more fatty acids. For simplicity and ease of description, the amount of the one or more fatty acids, the one or more diglycerides, and the one or more triglycerides can be referred to as being based on the combined weight of the triglycerides, diglycerides, and fatty acids rather than as being based on the one or more triglycerides, the one or more diglycerides, and the one or more fatty acids. For example, the mixture of one or more glycerides and one or more fatty acids can include at least 5 wt %, at least 6 wt %, at least 8 wt %, at least 10 wt %, at least 10.5 wt %, at least 11 wt %, at least 11.5 wt %, at least 12 wt %, at least 12.5 wt %, or at least 13 wt % to about 15 wt %, about 15.5 wt %, about 16 wt %, about 16.5 wt %, about 17 wt %, about 17.5 wt %, about 18 wt %, about 18.5 wt %, about 19 wt %, about 19.5 wt %, or about 20 wt % of the fatty acids, based on the combined weight of the triglycerides, diglycerides, and fatty acids. In another example, the mixture of one or more glycerides and one or more fatty acids can include about 11 wt % to about 16 wt %, about 14 wt % to about 15.5 wt %, about 11.5 wt % to about 14.5 wt %, about 11 wt % to about 14 wt %, or about 14 wt % to about 16 wt % of the one or more fatty acids, based on the combined weight of the triglycerides, diglycerides, and fatty acids. Illustrative fatty acids can include, but are not limited to, oleic acid, linoleic acid, conjugated linoleic acid, lauric acid, ricinoleic acid, stearic acid, palmitic acid, linolenic acid, palmitoleic acid, myristic acid, arachidic acid, behenic acid, or any mixture thereof.

The mixture of one or more glycerides and one or more fatty acids can include at least 1 wt %, at least 1.5 wt %, at least 2 wt %, at least 2.5 wt %, at least 3 wt %, or at least 3.5 wt % of the one or more diglycerides, based on the combined weight of the triglycerides, diglycerides, and fatty acids. For example, the mixture of one or more glycerides and one or more fatty acids can include at least 1 wt %, at least 1.5 wt %, at least 2 wt %, at least 2.5 wt %, at least 3 wt %, or at least 3.5 wt % to about 4 wt %, about 4.5 wt %, about 5 wt %, about 5.5 wt %, about 6 wt %, about 6.5 wt %, about 7 wt %, about 7.5 wt %, or about 8 wt % of the one or more diglycerides, based on the combined weight of the triglycerides, diglycerides, and fatty acids. For example, the mixture of one or more glycerides and one or more fatty acids can include about 1 wt % to about 6 wt %, about 2 wt % to about 5.5 wt %, about 3 wt % to about 5 wt %, about 3.5 wt % to about 5 wt %, or about 4 wt % to about 5 wt % of the one or more diglycerides, based on the combined weight of the triglycerides, diglycerides, and fatty acids. Illustrative diglycerides can include any two fatty acids covalently bonded to a glycerol molecule through ester linkages.

The mixture of one or more glycerides and one or more fatty acids can include less than 93 wt %, less than 92 wt %, less than 91 wt %, less than 90 wt %, less than 89 wt %, less than 88 wt %, less than 87 wt %, less than 86 wt %, less than 85 wt %, less than 84 wt %, or less than 83 wt % of the one or more triglycerides, based on the combined weight of the triglycerides, diglycerides, and fatty acids. For example, the mixture of one or more glycerides and one or more fatty acids can include about 60 wt %, about 65 wt %, about 70 wt %, about 72 wt %, about 74 wt %, about 75 wt %, or about 76 wt % to about 80 wt %, about 82 wt %, about 84 wt %, about 86 wt %, about 88 wt %, about 80 wt %, or about 92 wt % of the one or more triglycerides, based on the combined weight of the triglycerides, diglycerides, and fatty acids. In another example, the mixture of one or more glycerides and one or more fatty acids can include about 70 wt %, about 74 wt %, or about 76 wt % to less than 92 wt %, less than 90 wt %, less than 88 wt %, less than 87 wt %, less than 86 wt %, less than 85 wt %, less than 84 wt %, less than 83 wt %, or less than 82 wt % of the one or more triglycerides, based on the combined weight of the triglycerides, diglycerides, and fatty acids. In another example, the mixture of one or more glycerides and one or more fatty acids can include about 74 wt % to about 86 wt %, about 74 wt % to about 84 wt %, about 74 wt % to about 82 wt %, about 74 wt % to about 80 wt %, or about 74 wt % to about 78 wt % of the one or more triglycerides, based on the combined weight of the triglycerides, diglycerides, and fatty acids. Illustrative triglycerides can include any three fatty acids covalently bonded to a glycerol molecule through ester linkages.

In at least one example, the mixture of one or more glycerides and one or more fatty acids can include at least 5 wt %, at least 7 wt %, at least 9 wt %, at least 10 wt %, at least 10.5 wt %, at least 11 wt %, at least 11.5 wt %, at least 12 wt %, at least 12.5 wt %, or at least 13 wt % of the one or more fatty acids; at least 1 wt %, at least 1.5 wt %, at least 2 wt %, at least 2.5 wt %, at least 3 wt %, or at least 3.5 wt % of the one or more diglycerides; and less than 93 wt %, less than 92 wt %, less than 91 wt %, less than 90 wt %, less than 89 wt %, less than 88 wt %, less than 87 wt %, less than 86 wt %, less than 85 wt %, less than 84 wt %, or less than 83 wt % of the one or more triglycerides, where all weight percent values are based on the combined weight of the one or more triglycerides, the one or more diglycerides, and the one or more fatty acids. In another example, the mixture of one or more glycerides and one or more fatty acids can include at least 5 wt %, at least 6 wt %, at least 8 wt %, at least 10 wt %, at least 10.5 wt %, at least 11 wt %, at least 11.5 wt %, at least 12 wt %, at least 12.5 wt %, or at least 13 wt % to about 15 wt %, about 15.5 wt %, about 16 wt %, about 16.5 wt %, about 17 wt %, about 17.5 wt %, about 18 wt %, about 18.5 wt %, about 19 wt %, about 19.5 wt %, or about 20 wt % of the fatty acids; at least 1 wt %, at least 1.5 wt %, at least 2 wt %, at least 2.5 wt %, at least 3 wt %, or at least 3.5 wt % to about 4 wt %, about 4.5 wt %, about 5 wt %, about 5.5 wt %, about 6 wt %, about 6.5 wt %, about 7 wt %, about 7.5 wt %, or about 8 wt % of the one or more diglycerides; and about 60 wt %, about 65 wt %, about 70 wt %, about 72 wt %, about 74 wt %, about 75 wt %, or about 76 wt % to about 80 wt %, about 82 wt %, about 84 wt %, about 86 wt %, about 88 wt %, about 80 wt %, or about 92 wt % of the one or more triglycerides, where all weight percent values are based on the combined weight of the triglycerides, diglycerides, and fatty acids. In another example, the mixture of one or more glycerides and one or more fatty acids can include about 11 wt % to about 16 wt %, about 14 wt % to about 15.5 wt %, about 11.5 wt % to about 14.5 wt %, about 11 wt % to about 14 wt %, or about 14 wt % to about 16 wt % of the one or more fatty acids; about 1 wt % to about 6 wt %, about 2 wt % to about 5.5 wt %, about 3 wt % to about 5 wt %, about 3.5 wt % to about 5 wt %, or about 4 wt % to about 5 wt % of the one or more diglycerides; and about 74 wt % to about 92 wt %, about 74 wt % to about 88 wt %, about 74 wt % to about 82 wt %, about 74 wt % to about 80 wt %, or about 74 wt % to about 78 wt % of the one or more triglycerides, where all weight percent values are based on the combined weight of the triglycerides, diglycerides, and fatty acids.

In one or more embodiments, the mixture of one or more glycerides and one or more fatty acids can also include about 0.5 wt %, about 0.7 wt %, or about 0.9 wt % to about 1 wt %, about 1.05 wt %, or about 1.07 wt % of one or more phytosterols, based on the combined weight of the triglycerides, diglycerides, fatty acids, and phytosterols. For example, the mixture of one or more glycerides and one or more fatty acids can include about 0.5 wt % to about 1.05 wt %, about 0.8 wt % to about 1.07 wt %, about 0.9 wt % to about 1.02 wt %, or about 0.95 wt % to about 1.05 wt % of the one or more phytosterols, based on the combined weight of the triglycerides, diglycerides, fatty acids, and phytosterols. In another example, the mixture of one or more glycerides and one or more fatty acids can include at least 15 mg, at least 16 mg, at least 17 mg, at least 18 mg, at least 19 mg, or at least 20 mg to about 22 mg, about 25 mg, about 27 mg, or about 30 mg of the one or more phytosterols per gram of the mixture of one or more glycerides and one or more fatty acids that includes the triglycerides, diglycerides, fatty acids, and phytosterols. Illustrative phytosterols can include, but are not limited to, campesterol, campestanol, stigmasterol, sitosterol, sitostanol, avenasterol, cycloartenol, 24-methylene cycloartanol, citrostadienol, or any mixture thereof.

In one or more embodiments, the mixture of one or more glycerides and one or more fatty acids can also include about 0.1 wt %, about 0.3 wt %, about 0.5 wt %, about 0.7 wt %, or about 0.9 wt % to about 1 wt %, about 1.2 wt %, about 1.5 wt %, about 1.7 wt %, or about 1.9 wt % of one or more phospholipids, based on the combined weight of the triglycerides, diglycerides, fatty acids, and phospholipids.

In one or more embodiments, the mixture of one or more glycerides and one or more fatty acids can also include less than 1,500 µg, less than 1,400 µg, less than 1,300 µg, less than 1,200 µg, less than 1,100 µg, less than 1,000 µg, less than 975 µg, less than 950 µg, or less than 940 µg of one or more tocopherols per gram of the mixture of one or more glycerides and one or more fatty acids that includes the triglycerides, diglycerides, fatty acids, phytosterols, and the one or more tocopherols. For example, the mixture of one or more glycerides and one or more fatty acids can include about 1 µg, about 5 µ, about 10 µg, about 25 µg, about 50 µg, about 100 µg, or about 150 µg to about 500 µg, about 700 µg, about 900 µg, about 1,000 µg, about 1,200 µg, or about 1,400 µg of the one or more tocopherols per gram of the mixture of one or more glycerides and one or more fatty acids that includes the triglycerides, diglycerides, fatty acids, phytosterols, and the one or more tocopherols. Illustrative tocopherols can include, but are not limited to, alpha-tocopherol, gamma-tocopherol, delta-tocopherol, or any mixture thereof.

In one or more embodiments, the mixture of one or more glycerides and one or more fatty acids can also include one or more hydroxycinnamate steryl esters in an amount of about 0.05 wt %, about 0.1 wt %, about 0.2 wt %, about 0.25 wt %, or about 0.3 wt % to about 0.35 wt %, about 0.4 wt %, about 0.45 wt %, or about 0.5 wt %, based on the weight of the mixture of one or more glycerides and one or more fatty acids that includes the triglycerides, diglycerides, fatty acids, phytosterols, and the one or more hydroxycinnamate steryl esters.

In one or more embodiments, the mixture of one or more glycerides and one or more fatty acids can also include one or more carotenoids in an amount of at least 60 µg, at least 75 µg, at least 100 µg, at least 125 µg, at least 150 µg, at least 175 µg, or at least 200 µg to about 225 µg, about 250 µm, or about 275 µm per gram of the mixture of one or more glycerides and one or more fatty acids that includes the triglycerides, diglycerides, fatty acids, phytosterols, and the one or more carotenoids. For example, the mixture of one or more glycerides and one or more fatty acids can include about 60 µg, about 75 µg, about 80 µg, about 90 µg, about 100 µg, about 115 µg, or about 125 µg to about 200 µg, about 225 µg, about 250 µg, about 275 µg, about 300 µg, about 325 µg, about 350 µg, about 375 µg, or about 400 µg of one or more carotenoids per gram of the mixture of one or more glycerides and one or more fatty acids that includes the triglycerides, diglycerides, fatty acids, phytosterols, and the one or more carotenoids. Illustrative carotenoids can include, but are not limited to, lutein, zeaxanthin, beta-cryptoxanthin, beta-carotene, or any mixture thereof.

In one or more embodiments, the mixture of one or more glycerides and one or more fatty acids can also include one or more tocotrienols in an amount of at least 500 µg, at least 700 µg, at least 900 µg, at least 1,000 µg, or at least 1,100 µg to about 1,200 µg, about 1,300 µg, about 1,400 µg, about 1,500 µg, about 1,600 µg, about 1,700 µg, or about 1,800 µg per gram of the mixture of one or more glycerides and one or more fatty acids that includes the triglycerides, diglycerides, fatty acids, phytosterols, and the one or more tocotrienols. Illustrative tocotrienols can include, but are not limited to, alpha-tocotrienol, gamma-tocotrienol, delta-tocotrienol, or any mixture thereof.

The mixture of one or more glycerides and one or more fatty acids can have an iodine value of at least 115, at least 116, at least 117, or at least 118 to about 120, about 122, about 125, or about 130, as measured according to AOAC 920.158-1920(1998), Iodine absorption number of oils and fats. For example, the mixture of one or more glycerides and one or more fatty acids can have an iodine value of about 115 to about 130, about 116 to about 122, or about 118 to about 126, as measured according to AOAC 920.158-1920 (1998).

The bitumen, which can also be referred to as an "asphalt," can be or include any type of bitumen or bituminous material. For example, the bitumen can include bitumen that occurs in nature, bitumen recovered during the processing of crude oil and/or other heavy hydrocarbons, and/or bitumen synthetically produced. Illustrative bitumen can include, but is not limited to, vacuum tower bottoms, atmospheric tower bottoms, or a mixture thereof. The bitumen, e.g., vacuum tower bottoms, can be or include blown bitumen, visbroken bitumen, deasphalted bitumen, and/or recycled bitumen. The bitumen can have a viscosity at 60° C. of about 200 poise, about 300 poise, about 400 poise, about 500 poise, about 700 poise, about 1,000 poise, about 1,200 poise, or about 1,400 poise to about 1,600 poise, about 2,000 poise, about 2,300 poise, about 2,500 poise, about 2,700 poise, about 3,000 poise, about 3,300 poise, about 3,500 poise, about 3,700 poise, or about 4,000 poise. The bitumen can have a penetration at 25° C. of about 5 dmm, about 10 dmm, about 15 ddm, about 20 ddm, about 30 ddm, about 40 ddm, about 50 ddm, about 75 ddm, or about 100 ddm to about 200 ddm, about 250 ddm, about 300 ddm, about 325 ddm, about 350 ddm, or about 375 dmm, as measured according to ASTM D5/D5M-13, Standard Test Method for Penetration of Bituminous Materials.

The amount of the mixture of one or more glycerides and one or more fatty acids in the asphalt binder can widely vary, e.g., about 1 wt % to about 30 wt %, based on the combined weight of the bitumen and the mixture of one or more glycerides and one or more fatty acids. For example, the asphalt binder can include about 1 wt %, about 2 wt %, about 3 wt %, about 4 wt %, about 5 wt %, about 6 wt %, or about 7 wt % to about 10 wt %, about 12 wt %, about 14 wt %, about 16 wt %, about 18 wt %, about 20 wt %, about 22 wt %, about 24 wt %, or about 26 wt % of the mixture of one or more glycerides and one or more fatty acids, based on the combined weight of the bitumen and the mixture of one or more glycerides and one or more fatty acids. In another example, the asphalt binder can include about 1 wt % to about 25 wt %, about 1 wt % to about 10 wt %, about 5 wt % to about 15 wt %, about 9 wt % to about 19 wt %, about 13 wt % to about 21 wt %, about 1 wt % to about 6 wt %, about 7 wt % to about 12 wt %, about 15 wt % to about 25 wt %, or about 19 wt % to about 26 wt %, based on the combined weight of the bitumen and the mixture of one or more glycerides and one or more fatty acids.

The asphalt binder can include about 74 wt %, about 76 wt %, about 78 wt %, about 80 wt %, about 82 wt %, or about 84 wt % to about 89 wt %, about 91 wt %, about 93 wt %, about 95 wt %, about 97 wt %, or about 99 wt % of the bitumen, based on the combined weight of the bitumen and the mixture of one or more glycerides and one or more fatty acids. For example, the asphalt binder can include about 75 wt % to about 99 wt %, about 77 wt % to about 83 wt %, about 81 wt % to about 88 wt %, about 83 wt % to about 92 wt %, about 86 wt % to about 94 wt %, about 90 wt % to about 98 wt %, or about 84 wt % to about 94 wt % of the bitumen, based on the combined weight of the bitumen and the mixture of one or more glycerides and one or more fatty acids.

As noted above, one or more additional additives or materials can also be combined with the bitumen and the mixture of one or more glycerides and one or more fatty acids. Illustrative additives that can optionally be combined with the bitumen and the mixture of one or more glycerides and one or more fatty acids can include, but are not limited to, one or more hydrocarbon oils, one or more polymers, one or more acids, one or more hydrogen sulfide scavengers, one or more antistrips, one or more cross-linking agents, one or more surfactants, one or more waxes, or any mixture thereof.

The hydrocarbon oil can be or include a wide range of hydrocarbon oils. The hydrocarbon oil can be or include one or more hydrocarbon oils recovered from the distillation or fractionation of crude oil between number 2 diesel fuel oil and vacuum tower bottoms, one or more hydrocarbon oils recovered from the distillation or fractionation of a fluid catalytic cracker product, or any mixture thereof. Illustrative hydrocarbon oils can include, but are not limited to, gas oil, naphtha, number 3 fuel oil, number 4 fuel oil, number 5 fuel oil, number 6 fuel oil, one or more waxes, or any mixture thereof. Illustrative waxes can include, but are not limited to, petroleum wax, polyethylene was, montan wax, branched aliphatic waxes produced as a by-product of the Fischer-Tropsch synthesis of liquid fuels from natural gas, or any mixture thereof. If the hydrocarbon oil is present in the asphalt binder, the asphalt binder can include about 0.5 wt %, about 1 wt %, about 3 wt %, about 5 wt %, about 7 wt %, about 10 wt %, about 12 wt %, about 15 wt %, or about 17 wt % to about 25 wt %, about 30 wt %, about 35 wt %, about 40 wt %, about 45 wt %, about 50 wt %, or about 55 wt % of the hydrocarbon oil, based on the combined weight of the bitumen, the mixture of one or more glycerides and one or more fatty acids, and the hydrocarbon oil. For example, the asphalt binder can include about 0.5 wt % to about 55 wt %, about 0.5 wt % to about 3 wt %, about 1 wt % to about 8 wt %, about 3 wt % to about 5 wt %, about 6 wt % to about 17 wt %, about 8 wt % to about 12 wt %, about 9 wt % to about 30 wt %, about 11 wt % to about 19 wt %, about 14 wt % to about 40 wt %, about 16 wt % to about 22 wt %, about 20 wt % to about 36 wt %, about 26 wt % to about 50 wt %, about 28 wt % to about 38 wt %, about 36 wt % to about 44 wt %, about 38 wt % to about 48 wt %, about 34 wt % to about 54 wt %, or about 36 wt % to about 52 wt % of the hydrocarbon oil, based on the combined weight of the bitumen, the mixture of one or more glycerides and one or more fatty acids, and the hydrocarbon oil.

The one or more polymers can include, but are not limited to, butyl rubber, polybutadiene rubber, polyisoprene rubber, polyisobutene rubber, ethylene/vinyl acetate copolymer, polyacrylate, polymethacrylate, polychloroprene, polynorbornene, ethylene/propylene/diene (EPDM) terpolymer, a random or block copolymer of a vinyl aromatic compound, e.g., styrene, and a conjugated diene, or any mixture thereof.

In one example, the polymer can be or include a styrene/conjugated diene block copolymer that can be linear, radial, or multi-branched. A styrene/butadiene copolymer and/or a styrene/isoprene copolymer can have an average molecular weight of about 4,000, about 10,000, about 30,000, about 50,000, or about 80,000 to about 120,000, about 150,000, about 200,000, about 300,000, or about 500,000. The weight average molecular weight can be measured by GPC chromatography, with a polystyrene standard according to standard ASTM D3536-91, Test Method for Molecular Weight Averages and Molecular Weight Distribution of Polystyrene by Liquid Exclusion Chromatography (Gel Permeation Chromatography—GPC) (Withdrawn 1996). The weight average molecular can also be measured according to ASTM D5296-11, Standard Test Method for Molecular Weight Averages and Molecular Weight Distribution of Polystyrene by High Performance Size-Exclusion Chromatography.

As used herein, the term "conjugated diene" refers to alkene compounds having 2 or more sites of unsaturation, where a second site of unsaturation is conjugated to a first site of unsaturation. More particularly, the first carbon atom of the second site of unsaturation can be a gamma (at carbon atom 3) relative to the first carbon atom of the first site of unsaturation. Illustrative conjugated dienes can include, but are not limited to, butadiene, isoprene, and 1,3-pentadiene. The phrase "block copolymers of styrene and conjugated-dienes" can refer to copolymers of styrene and conjugated-dienes having a linear or radial, tri-block structure that includes styrene-conjugated diene-styrene block units that are copolymers are represented by the chemical formula: $S_x$-$D_y$-$S_z$, where D can be a conjugated-diene, S can be styrene, and x, y and z can be integers such that the number average molecular weight of the copolymer can be about 4,000 to about 500,000. Such tri-block copolymers can be derived from styrene and a conjugated-diene, where the conjugated-diene is butadiene or isoprene. Such copolymers can contain about 15 wt % to about 50 wt % or about 20 wt % to about 35 wt %, or about 28 wt % to about 31 wt % copolymer units derived from styrene, based on the combined weight of styrene and conjugated-diene(s). These copolymers can have a number average molecular weight of about 50,000 to about 200,000 or about 80,000 to about 180,000.

If the polymer is present in the asphalt binder, the asphalt binder can include about 0.01 wt %, about 0.1 wt %, about 0.5 wt %, about 1 wt %, or about 2 wt % to about 4 wt %, about 6 wt %, about 8 wt %, about 10 wt %, about 12 wt %, about 14 wt %, about 16 wt %, about 18 wt %, or about 20 wt % of the polymer, based on the combined weight of the bitumen, the mixture of one or more glycerides and one or more fatty acids, and the polymer. For example, the asphalt binder can include about 1 wt % to about 10 wt %, about 5 wt % to about 10 wt %, about 2 wt % to about 6 wt %, about 8 wt % to about 14 wt %, or about 1 wt % to about 6 wt % of the polymer, based on the combined weight of the bitumen, the mixture of one or more glycerides and one or more fatty acids, and the polymer.

The one or more acids can be or include an inorganic acid. Illustrative inorganic acids can include, but are not limited to, phosphoric acid, polyphosphoric acid, sulfuric acid, hydrochloric acid, nitric acid, or any mixture thereof. If the acid is present in the asphalt binder, the asphalt binder can include about 0.01 wt %, about 0.05 wt %, about 0.1 wt %, about 0.15 wt %, or about 0.2 wt % to about 0.4 wt %, about 0.5 wt %, about 0.7 wt %, or about 1 wt % of the acid, based on the combined weight of the bitumen, the mixture of one or more glycerides and one or more fatty acids, and the acid.

The one or more antistrip additives can include, but are not limited to, lime, one or more amines, one or more phosphate esters, or any mixture thereof. Illustrative lime can include, but is not limited to, hydrated lime, quick lime, dolomitic lime, or any mixture thereof. Illustrative amines can include, but are not limited to, polyamines, amidoamines, or a mixture thereof. Suitable amines can include, but are not limited to, tallow diamine, tallow triamine, bishexamethylenetriamine, triethylenepentamine, or any mixture thereof. If the antistrip additive is present in the asphalt binder, the asphalt binder can include about 0.01 wt %, about 0.05 wt %, about 0.1 wt %, about 0.2 wt %, or about 0.3 wt % to about 0.5 wt %, about 0.7 wt %, about 1 wt %, about 1.2 wt %, about 1.5 wt %, or about 1.7 wt % of the antistrip additive, based on the combined weight of the bitumen, the mixture of one or more glycerides and one or more fatty acids, and the antistrip additive.

The one or more hydrogen sulfide scavengers can include, but are not limited to, zinc containing compounds, cobalt containing compounds, copper containing compounds, or any mixture thereof. If the hydrogen sulfide scavenger is present in the asphalt binder, the asphalt binder can include about 0.01 wt %, about 0.05 wt %, about 0.07 wt %, about 0.1 wt %, about 0.12 wt %, about 0.15 wt %, about 0.17 wt %, or about 0.2 wt % to about 0.25%, about 0.3%, about 0.35%, about 0.4%, about 0.45%, or about 0.50 wt % of the hydrogen sulfide scavenger, based on the combined weight of the bitumen, the mixture of one or more glycerides and one or more fatty acids, and the hydrogen sulfide scavenger.

The one or more cross-linking agents can include, but are not limited to, elemental sulfur, organo-sulfur compounds, peroxides, or any mixture thereof. The elemental sulfur can be in the form of prills or pellets, can be molten, or a combination thereof. Illustrative organo-sulfur compounds can include, but are not limited to, hydrocarbyl polysulfides, thiuram polysulfides, alkyl phenol disulfides, mercaptobenzylthiazol and derivatives thereof, dithiocarbamates, thiuram monosulfides, morpholine disulfides, N,N'-disulphide of caprolactam, or any mixture thereof. Illustrative peroxides can include, but are not limited to, dihydrocarbyl peroxides, such as di-tert-butyl peroxide and dicumyl peroxide, or any mixture thereof. If the asphalt binder includes a cross-linking agent, the asphalt binder can include about 0.01 wt %, about 0.05 wt %, about 0.07 wt %, about 0.1 wt %, about 0.12 wt %, about 0.15 wt %, or about 0.17 wt % to about 0.2 wt %, about 0.23 wt %, about 0.25 wt %, about 0.27 wt %, about 0.3 wt %, about 0.33 wt %, about 0.35 wt %, about 0.37 wt %, or about 0.40 wt % of the cross-linking agent, based on the combined weight of the bitumen, the mixture of one or more glycerides and one or more fatty acids, and the cross-linking agent.

The one or more surfactants can include, but are not limited to amines, diamines, polyamines, ethoxylated amines, ethoxylated alkyl diamines, ethoxylated alkyl polyamines, amido amines, amidopolyamines, imidazolines, any of their corresponding organic or inorganic salts, or any mixture thereof. If the asphalt binder includes a surfactant, the asphalt binder can include about 0.1 wt %, about 0.3 wt %, about 0.5 wt %, or about 0.7 wt % to about 1 wt %, about 1.3 wt %, or about 1.5 wt % wt % of the surfactant, based on the combined weight of the bitumen, the mixture of one or more glycerides and one or more fatty acids, and the surfactant.

The asphalt binder can have a complex shear modulus (G*) of about 0.1, about 0.3, about 0.5, about 0.7, about 1, about 1.3, about 1.5, about 1.7, or about 2 to about 3, about 3.3, about 3.5, about 3.7, about 4, about 4.3, about 4.5, about 4.7, or about 5 at a temperature of about 64° C. For example, the asphalt binder can have a complex shear modules of about 0.1 to about 2, about 0.5 to about 4, about 1 to about 3.2, about 0.8 to about 4.4, about 1.2 to about 3.6, about 2.8 to about 4.8, or about 0.1 to about 5 at a temperature of about 64° C. In another example, the asphalt binder can have a complex shear modules of at least 0.1, at least 0.4, at least 0.6, at least 0.8, at least 1, at least 1.2, at least 1.4, at least 1.6, at least 1.8, at least 2, at least 2.2, at least 2.4, or at least 2.6 and up to about 3.2, about 3.4, about 3.6, about 3.8, about 4.2, about 4.4, about 4.6, or about 4.8 at a temperature of about 64° C. The asphalt binder can have a phase angle (δ) of about 80, about 81, about 82, about 83, or about 84 to about 86, about 87, about 88, about 89, or about 90 at a temperature of about 64° C. For example, the asphalt binder can have a phase angle (δ) of about 80 to about 90, about 80 to about 84, about 83 to about 87, about 85 to about 89, about 87 to about 89, about 82 to about 88, about 83 to about 87, or about 80 to about 85 at a temperature of about 64° C. In another example, the asphalt binder can have a phase angle (δ) of at least 80 to about 90, at least 80 to about 84, at least 83 to about 87, at least 85 to about 89, at least 87 to about 89, at least 82 to about 88, at least 83 to about 87, or at least 80 to about 85 at a temperature of about 64° C. The complex shear modulus (G*) refers to the asphalt binder's total resistance to deformation when repeatedly sheared, while the phase angle (δ), is the lag between the applied shear stress and the resulting shear strain. The larger the phase angle (δ), the more fluid the material. As used herein, the complex shear modulus (G*) and the phase angle (δ) can be measured according to AASHTO T-315-12, Standard Method of Test for Determining the Rheological Properties of Asphalt Binder Using a Dynamic Shear Rheometer (DSR), unless otherwise noted.

The asphalt binder, when subjected to a Rolling Thin Film Oven procedure according to AASHTO T-315-12, can have a complex shear modulus (G*) of about 0.2, about 0.4, about 0.6, about 0.8, about 1, about 1.2, about 1.4, about 1.6, about 1.8, about 2, about 2.2, about 2.4, about 2.6, about 2.8, about 3, about 3.2 about 3.4, about 3.6, about 3.8, or about 4 to about 6, about 6.5, about 7, about 7.5, about 8, about 8.5, about 9, about 9.5, or about 10 at a temperature of about 64° C. For example, the asphalt binder, when subjected to a Rolling Thin Film Oven procedure according to AASHTO T-315-12, can have a complex shear modulus (G*) of about 0.3 to about 3, about 0.3 to about 8, about 1 to about 4, about 2 to about 5, about 3 to about 6, about 4 to about 7, about 5 to about 8, about 6 to about 9, or about 7 to about 10. In another example, the asphalt binder, when subjected to a Rolling Thin Film Oven procedure according to AASHTO T-315-12, can have a complex shear modulus (G*) of less than 10, less than 9, less than 8, less than 7, less than 6, less than 5, less than 4, less than 3, less than 2, or less than 1.

The asphalt binder can have a PG Grade (high temperature) complex shear modulus (G*) (kPa) of about 1, about 1.1, about 1.2, or about 1.3 to about 1.4, about 1.5, about 1.6, about 1.7, or about 1.8, as measured according to AASHTO T-315-12. For example, the asphalt binder can have a PG Grade (high temperature) complex shear modulus (G*) (kPa) of at least 1, at least 1.1, at least 1.15, at least 1.2, at least 1.25, or at least 1.3 to about 1.4, about 1.5, about 1.6, about 1.7, or about 1.8, as measured according to AASHTO T-315-12.

The asphalt binder can have a PG Grade (high temperature) phase angle (δ) (degrees) of about 50, about 55, about 60, or about 65 to about 70, about 75, about 80, about 85, or about 90, as measured according to AASHTO T-315-12. For example, the asphalt binder can have a PG Grade (high temperature) phase angle (δ) (degrees) of at least 53, at least 55, at least 57, at least 59, at least 61, or at least 63 to about 67, about 69, about 71, about 73, about 75, about 79, about 81, about 83, about 85, about 87, or about 90, as measured according to AASHTO T-315-12.

The asphalt binder can have a PG Grade (high temperature) G*/sin(δ) (kPa) of about 1, about 1.1, about 1.2, or about 1.3 to about 1.4, about 1.5, about 1.6, about 1.7, or about 1.8, as measured according to AASHTO T-315-12. For example, the asphalt binder can have a PG Grade (high temperature) G*/sin(δ) (kPa) of at least 1, at least 1.15, at least 1.2, at least 1.25, at least 1.3, at least 1.35, or at least 1.4 to about 1.5, about 1.6, about 1.7, or about 1.8, as measured according to AASHTO T-315-12.

The creep stiffness (S) of a pressure aging vessel (PAV) aged asphalt binder can be about 100 MPa, about 150 MPa, or about 200 MPa to about 250 MPa, about 275 MPa, or about 300 MPa, as measured according to AASHTO T-313-12, Standard Method of Test for Determining the Flexural Creep Stiffness of Asphalt Binder Using the Bending Beam Rheometer (BBR). For example, the creep stiffness (S) of a pressure aging vessel (PAV) aged asphalt binder can be at least 100 MPa, at least 125 MPa, at least 140 MPa, at least 150 MPa, at least 160 MPa, or at least 170 MPa to about 200 MPa, about 225 MPa, about 240 MPa, about 260 MPa, about 270 MPa, about 280 MPa, or about 300 MPa, as measured according to AASHTO T-313-12. In another example, the creep stiffness (S) of a pressure aging vessel (PAV) aged asphalt binder can be about 100 MPa, about 125 MPa, about 140 MPa, about 150 MPa, about 160 MPa, or about 170 MPa to less than 200 MPa, less than 225 MPa, less than 240 MPa, less than 260 MPa, less than 270 MPa, less than 280 MPa, or less than 300 MPa, as measured according to AASHTO T-313-12.

The slope value of a pressure aging vessel (PAV) aged asphalt binder can be about 0.3, about 0.31, or about 0.32 to about 0.33, about 0.34, about 0.35, about 0.36, about 0.37, or about 0.38, as measured according to AASHTO T-313-12. For example, the slope value of a pressure aging vessel (PAV) aged asphalt binder can be at least 0.3, at least 0.31, at least 0.32, or at least 0.33 to about 0.34, about 0.35, about 0.36, about 0.37, or about 0.38, as measured according to AASHTO T-313-12. In another example, the slope value of a pressure aging vessel (PAV) aged asphalt binder can be about 0.3, about 0.31, about 0.32, or about 0.33 and less than 0.38, less than 0.37, less than 0.36, or less than 0.35, as measured according to AASHTO T-313-12.

The PAV aged asphalt binder can have a Glover-Rowe (kPA) of about 1, about 5, about 10, or about 15 to about 20, about 25, about 30, about 35, or about 40. For example, the PAV aged asphalt binder can have a Glover-Rowe (kPa) of less than 40, less than 37, less than 35, less than 33, less than 31, less than 30, less than 29, less than 27, less than 25, less than 23, less than 20, less than 17, less than 15, less than 13, less than 11, less than 10, less than 9, less than 7, less than 5, less than 3, less than 2, or less than 1. In another example, PAV aged asphalt binder can have a Glover-Rowe (kPa) of about 0.5 to about 36, about 1 to about 10, about 5 to about 15, about 10 to about 20, about 15 to about 25, about 20 to about 30, about 1 to about 3, about 2 to about 6, about 3 to about 7, about 4 to about 8, about 5 to about 9, about 6 to about 10, about 7 to about 11, about 8 to about 12, about 9 to about 13, about 10 to about 14, about 11 to about 15, about 12 to about 16, about 13 to about 17, about 14 to about 18, about 15 to about 19, about 16 to about 20, about 17 to about 21, about 18 to about 22, about 19 to about 23, about 20 to about 24, about 21 to about 25, about 22 to about 26, about 23 to about 27, or about 24 to about 28. In another example, the PAV aged asphalt binder can have a Glover-Rowe (kPa) of about 0.5, about 1, about 2, about 3, about 4, about 5, about 6, about 7, about 8, about 9, about 10, about 11, about 12, about 13, about 14, or about 15 to about 16, about 17, about 18, about 19, about 20, about 21, about 22, about 23, about 24, about 25, about 26, about 27, about 28, about 29, about 30, about 31, about 32, about 33, about 34, or about 35. The Glover-Rowe (kPA) value of the PAV aged asphalt binder can be measured according to Report Number FHWA/TX-05/1872-2 (Federal Highway Administration and Texas Department of Transportation, 2005).

The age-induced surface cracking (ΔTc) or ΔTc parameter of a PAV aged asphalt binder can be about −3, about −2.5, about −2, or about −1.5 to about −1.0, about −0.5, about 0, about 0.5, about 1, about 1.5, about 2, about 2.5, about 3, or about 3.5. For example, the PAV aged asphalt binder can have an age-induced surface cracking (ΔTc) of less than 3.5, less than 3.3, less than 3, less than 2.7, less than 2.5, less than 2.3, less than 2, less than 1.7, less than 1.5, less than 1.3, less than 1, less than 0.7, less than 0.5, less than 0.3, less than 0, less than −0.3, less than −0.5, less than −0.7, less than −1, less than −1.3, less than −1.5, less than −1.7, less than −2, less than −2.2, less than −2.3, less than −2.5, less than −2.7, or less than −2.9. In another example, the PAV aged asphalt binder can have an age-induced surface cracking (ΔTc) of about −2.5 to about 1, about −2 to about 0.5, about −1.6 to about 0, about −1.2 to about −0.2, about 1- to about −0.5, or about −1.6 to about −0.1. In another example, the PAV aged asphalt binder can have an age-induced surface cracking (ΔTc) of about −2.5, about −2.3, about −2, about −1.7, about −1.5, or about −1.3 to about −1, about −0.7, about −0.5, about −0.3, about 0, about 0.3, about 0.5, about 0.7, about 1, about 1.3, about 1.5, about 1.7, about 2, about 2.3, about 2.5, about 2.7. The age-induced surface cracking (ΔTc) of the PAV aged asphalt binder can be measured according to Report Number FHWA/TX-05/1872-2 (Federal Highway Administration and Texas Department of Transportation, 2005). The age-induced surface cracking (ΔTc) value can be the difference between the BBR test temperature where stiffness (S)=300 MPa and the temperature where the slope (m-value) equals 0.3. For example, the ΔTc parameter of a PAV aged asphalt binder can be from about −3 to about 2, about −2.3 to about −1.1, about −1.8 to about 1.4, about −0.5 to about 1.6, about 0.7 to about 2.6, about 1.6 to about 3.1, or about 2.2 to about 3.4 as calculated for the difference between the BBR test temperature where stiffness (S)=300 MPa and the temperature where the slope (m-value) equals 0.3.

The asphalt binder can meet the product specifications for XX-34, PG 46-34, PG 46-40, PG 49-34, PG 49-40, PG 52-34, PG 52-34 CIR, PG 52-40, PG 58-34, PG 58-40, PG 64-34, PG 64-40, PG 70-34, PG 70-40, PG 58-28, PG 64-28, PG 70-28, PG 76-28, PG 64S,H,V, or E-28, PG 64S,H,V, or E-22, PG 58S,H,V, or E-28, PG 58-22S,H,V or E-22, PG 52S,H,V or E-34, or PG 52S,H,V or -34, PG 46S,H,V, or E-34, PG 46S,H,V, or E-40, as measured according to AASHTO M320 (10$^{th}$ Edition, Jan. 1, 2010), and AASHTO M332, Standard Specification for Performance-Graded Asphalt Binder Using Multiple Stress Creep Recovery (MSCR) Test. The asphalt binder can meet or exceed the product specifications for XX-34, PG 46-34, PG 46-40, PG 49-34, PG 49-40, PG 52-34, PG 52-34 CIR, PG 52-40, PG 58-34, PG 58-40, PG 64-34, PG 64-40, PG 70-34, PG 70-40, PG 58-28, PG 64-28, PG 70-28, PG 76-28, PG 64S,H,V, or E-28, PG 64S,H,V, or E-22, PG 58S,H,V, or E-28, PG 58-22S,H,V or E-22, PG 52S,H,V or E-34, or PG 52S,H,V, or -34, PG 46S,H,V, or E-34, PG 46S,H,V, or E-40, as measured according to AASHTO M320 and AASHTO M332. In one or more embodiments, the asphalt binder can meet the product specifications for XX-34, PG 46-34, PG 46-40, PG 49-34, PG 49-40, PG 52-34, PG 52-34 CIR, PG 52-40, PG 58-34, PG 58-40, PG 64-34, PG 64-40, PG 70-34, PG 70-40, PG 58-28, PG 64-28, PG 70-28, PG 76-28, PG 64S,H,V, or E-28, PG 64S,H,V, or E-22, PG 58S,H,V, or E-28, PG 58-22S,H,V or E-22, PG 52S,H,V or E-34, or PG 52S,H,V, or -34, PG 46S,H,V, or E-34, PG 46S,H,V, or E-40, as measured according to AASHTO M320 and AASHTO M332, and at least one property of the asphalt binder can exceed the product specification by at least 0.5%, at least 1%, at least 2%, at least 3%, at least 4%, at least 5%, at least 6%, at least 7%, at least 8%, at least 8%, or at least 10% to about 20%, about 30%, about 40%, or about 50% or more. In one or more embodiments, the asphalt binder can meet the product specifications for XX-34, PG 46-34, PG 46-40, PG 49-34, PG 49-40, PG 52-34, PG 52-34 CIR, PG 52-40, PG 58-34, PG 58-40, PG 64-34, PG 64-40, PG 70-34, PG 70-40, PG 58-28, PG 64-28, PG 70-28, PG 76-28, PG 64S,H,V, or E-28, PG 64S,H,V, or E-22, PG 58S,H,V, or E-28, PG 58-22S,H,V or E-22, PG 52S,H,V or E-34, or PG 52S,H,V, or -34, PG 46S,H,V, or E-34, PG 46S,H,V, or E-40, as measured according to AASHTO M320 and AASHTO M332, and at least two properties of the asphalt binder can exceed the product specification by at least 0.5%, at least 1%, at least 2%, at least 3%, at least 4%, at least 5%, at least 6%, at least 7%, at least 8%, at least 8%, or at least 10% to about 20%, about 30%, about 40%, or about 50% or more.

The asphalt binder can be made, produced, formed, or otherwise prepared by mixing, blending, or otherwise combining the bitumen and the mixture of one or more glycerides and one or more fatty acids with one another. For example, the bitumen, the mixture of one or more glycerides and one or more fatty acids, and if present, any additional additives, can be blended with one another by a tank blending process and/or an in-line blending process. In-tank blending, the components, e.g., the bitumen and the mixture of one or more glycerides and one or more fatty acids, can be added to a tank in desired or predetermined proportions, and mixed using various combinations of pumping/recirculation systems and/or agitators (e.g., vertical shaft with paddles, side-mounted, ribbon blender, etc.). In in-line blending, each component, e.g., the bitumen and the mixture of one or more glycerides and one or more fatty acids, can be pumped into a single pipe, conduit, or other "line." Meters and/or other flow control devices can be used to control the input flow of each individual component by weight, e.g., a mass flow meters, and/or by volume. The components can be blended or mixed using only the natural shear resulting from fluid flow through the line. One or more static and/or mechanical in-line mixers can also be used to improve or promote the blending or mixing of the components within the line. One or more in-line measuring devices such as viscometers and/or densitometers can be used to measure or monitor one or more properties of the asphalt binder that can improve the consistency of the asphalt binder over time. The asphalt binder, whether prepared by in-tank blending, in-line blending, or any other method, can be transferred, e.g., via a pump, to a transport vessel such as a tanker truck, a rail car, or a barge.

If one or more additives are combined with the bitumen and the mixture of one or more glycerides and one or more fatty acids, the components of the asphalt binder, e.g., the bitumen, the mixture of one or more glycerides and one or more fatty acids, and an additive, can be combined with one another in any order or sequence to produce the asphalt binder. For example, the bitumen and mixture of one or more glycerides and one or more fatty acids can be combined with one another to produce an intermediate binder and one or more additives can be combined with the intermediate binder to produce the asphalt binder. In another example, one or more additives can be combined with the bitumen to produce an intermediate binder and the mixture of one or more glycerides and one or more fatty acids can be combined with the intermediate binder to produce the asphalt binder. In another example, the bitumen, the mixture of one or more glycerides and one or more fatty acids, and one or more additives can be simultaneously combined with one another to produce the asphalt binder.

It has been surprisingly and unexpectedly found that when a polymer additive is combined with the bitumen and the mixture of one or more glycerides and one or more fatty acids, the time required for the polymer to melt can be reduced by combining the polymer with an intermediate binder composed of the bitumen and the mixture of one or more glycerides and one or more fatty acids. For example, it has been found that combining the mixture of one or more glycerides and one or more fatty acids with the bitumen to produce an intermediate binder, and then combining a styrene-butadiene-styrene polymer with the intermediate binder can significantly reduce the time required for the styrene-butadiene-styrene polymer to melt. The polymer can be combined with the intermediate binder under low shear and/or high shear agitation at a temperature of about 160° C. to about 205° C. in a time period of less than 360 minutes, less than 320 minutes, less than 280 minutes, less than 240 minutes, less than 200 minutes, less than 160 minutes, less than 120 minutes, less than 100 minutes, less than 90 minutes, less than 80 minutes, less than 70 minutes, less than 60 minutes, less than 50 minutes, less than 40 minutes, or less than 30 minutes. For example, the polymer can be combined with the intermediate binder under low shear or high shear agitation at a temperature of about 160° C. to about 205° C. in a time period of about 15 minutes to about 45 minutes, about 30 minutes to about 55 minutes, about 40 minutes to about 80 minutes, about 60 minutes to about 240 minutes, or about 240 minutes to about 360 minutes. In another example, the polymer can be combined with the intermediate binder under low shear at a temperature of about 160° C. to about 205° C. in a time period of about 30 minutes to about 220 minutes, about 40 minutes to about 80 minutes, about 60 minutes to about 120 minutes, about 100 minutes to about 180 minutes, about 160 minutes to about 220 minutes, or about 180 minutes to about 230 minutes. the polymer can be combined with the intermediate binder under high shear at a temperature of about 160° C. to about 205° C. in a time period of about 10 minute to about 55 minutes, about 15 minutes to about 50 minutes, about 20 minutes to about 40 minutes, about 15 minutes to about 45 minutes, about 20 minutes to about 55 minutes, or about 25 minutes to about 45 minutes. In another example, without the mixture of one or more glycerides and one or more fatty acids present in the asphalt binder, the SBS polymer is currently combined with asphalt binders in about 4 hours to about 7 hours under low shear mixing and in about 1 hour under high shear mixing. When the mixture of one or more glycerides and one or more fatty acids is present in the asphalt binder, the SBS polymer can be combined with the asphalt binder in about 120 minutes to about 300 minutes, or about 120 minutes to about 230 minutes under low shear mixing and in about 15 minutes to about 55 minutes or about 30 minutes to about 45 minutes under high shear mixing.

If one or more cross-linking agents are combined with the bitumen and the mixture of one or more glycerides and one or more fatty acids, the cross-linking agent can preferably be added after other additives. For example, if a polymer is also combined with the bitumen and the mixture of one or more glycerides and one or more fatty acids, the cross-linking agent can be added after the bitumen, the mixture of one or more glycerides and one or more fatty acids, and the polymer are combined with one another. Without wishing to be bound by theory, it is believed that the improved compatibility of the mixture of one or more glycerides and one or more fatty acids when used in combination with SBS polymers is due, at least in part, to the fact that double bonds in these molecules can cross-link with the double bonds in the polymer during vulcanization. Hydrocarbon oils do not contain double bonds that can be vulcanized, and thus do not offer the same advantages when combined with vulcanizable polymer systems. If one or more hydrogen sulfide scavengers are combined with asphalt binder that includes a cross-linking agent, the one or more hydrogen sulfide scavengers can be combined before, with, or after the cross-linking agent.

In one or more embodiments, the asphalt binder can be in the form of a cationic, anionic, or non-ionic asphalt emulsion. An emulsion of the asphalt binder can be prepared by producing a soap solution of an acid, a caustic, an amine, or an emulsifying agent. The soap solution can be mixed with the asphalt binder. For example, the asphalt binder can be emulsified by milling with the soap solution through a high shear colloid mill to produce an emulsified asphalt binder. Alternatively, the bitumen, with or without any additives, can be emulsified to provide an emulsified bitumen. The mixture of one or more glycerides and one or more fatty acids can be combined with the emulsified bitumen, e.g., tank or in-line blending, to produce the emulsified asphalt binder.

The asphalt binder can be combined with a plurality of solids to produce a paving composition. The solids can be derived from natural sources and/or synthetic sources. Natural solids can be or include, but are not limited to, rock extracted from an open excavation (e.g., a quarry) that has been reduced to a usable size by mechanical crushing. Manufactured or synthetic solids can be or include, but are not limited to, one or more byproducts recovered from one or more manufacturing processes, such as slag from a metallurgical process (e.g., steel, tin, and/or copper production). Manufactured or synthetic solids can also be or include specialty materials that can be produced to have a particular physical properties not found in natural rock, such as a low density compared to natural rock. Illustrative solids can include, but are not limited to, sand, gravel, crushed stone, crushed concrete, crushed glass, industrial slag, or any mixture thereof.

One property of the solids is the gradation of the solids, which refers to the percent of solids of a given size. For most paving compositions, three gradations are common: dense-graded, gap-graded, and open-graded. Dense-graded solids or dense-graded aggregate exhibit the greatest mineral surface area (per unit of solids). Open-graded solids or open-graded aggregate generally include a single, large-sized (e.g., about 0.375 inches to about 1 inch) stone with very low levels (typically less than about two weight percent of the total aggregate) of fines (material of less than 0.25 inches) or filler (mineral material of less than 0.075 mm). Gap-graded solids or gap-graded aggregate generally fall between dense-graded solids and open-graded solids. Any solids traditionally employed in the production of paving compositions can be combined with the asphalt binder to produce asphalt paving compositions, including dense-graded aggregate, gap-graded aggregate, open-graded aggregate, reclaimed asphalt pavement, or any mixture thereof.

The paving composition can include about 85 wt %, about 88 wt %, about 90 wt %, about 92 wt %, or about 94 wt % to about 96 wt %, about 97 wt %, about 98 wt %, or about 99 wt % of the solids, based on the combined weight of the solids and the asphalt binder. For example, the paving composition can include about 90 wt % to about 99 wt %, about 90 wt % to about 94 wt %, about 93 wt % to about 97 wt %, or about 96 wt % to about 98 wt % of the solids, based on the combined weight of the solids and the asphalt binder.

The asphalt binder can be used to form an asphalt paving composition that can have a passes to failure (left) of at least 1,000, at least 2,000, at least 3,000, at least 4,000, at least 5,000, at least 6,000, at least 7,000, at least 8,000, at least 9,000, at least 10,000, at least 11,000, at least 12,000, at least 13,000, at least 14,000, at least 15,000, at least 16,000, at least 17,000, at least 18,000, at least 19,000, at least 20,000, at least 21,000, at least 22,000, at least 23,000, at least 24,000, or at least 25,000 or more, as measured according to AASHTO T-324-14, Standard Method of Test for Hamburg Wheel-Track Testing of Compacted Hot-Mix Asphalt (HMA) at a temperature of about 50° C. For example, the asphalt binder can be used to form an asphalt paving composition that can have a passes to failure (left) of about 3,000, about 5,000, about 7,500, about 9,500, or about 12,500 to about 16,500, about 18,500, about 20,500, about 24,500, about 27,000, about 29,000, about 31,000, or about 35,000, as measured according to AASHTO T-324 at a temperature of about 50° C. The asphalt binder can be used to form an asphalt paving composition that can have a passes to failure (right) of at least 1,000, at least 2,000, at least 3,000, at least 4,000, at least 5,000, at least 6,000, at least 7,000, at least 8,000, at least 9,000, at least 10,000, at least 11,000, at least 12,000, at least 13,000, at least 14,000, at least 15,000, at least 16,000, at least 17,000, at least 18,000, at least 19,000, at least 20,000, at least 21,000, at least 22,000, at least 23,000, at least 24,000, or at least 25,000 or more, as measured according to AASHTO T-324 at a temperature of about 50° C. For example, the asphalt binder can be used to form an asphalt paving composition that can have a passes to failure (right) of about 3,000, about 5,000, about 7,500, about 9,500, or about 12,500 to about 16,500, about 18,500, about 20,500, about 24,500, about 27,000, about 29,000, about 31,000, or about 35,000, as measured according to AASHTO T-324 at a temperature of about 50° C. The asphalt binder can be used to form an asphalt paving composition that can have an average stripping inflection point (SIP) of at least 3,000, at least 5,000, at least 7,000, at least 9,000, at least 11,000, at least 13,000, at least 15,000, at least 17,000, or at least 19,000 or more, as measured according to AASHTO T-324 at a temperature of about 50° C. For example, the asphalt binder can be used to form an asphalt paving composition that can have an average stripping inflection point (SIP) of about 4,000, about 6,000, about 8,000, about 10,000, or about 12,000 to about 14,000, about 16,000, about 18,000, or about 20,000, as measured according to AASHTO T-324 at a temperature of about 50° C.

EXAMPLES

In order to provide a better understanding of the foregoing discussion, the following non-limiting examples are offered. Although the examples can be directed to specific embodiments, they are not to be viewed as limiting the invention in any specific respect. All parts, proportions, and percentages are by weight unless otherwise indicated.

Example I

A dynamic shear rheometer (DSR) was used to measure the complex shear modulus (G*), phase angle (δ), and the parameter G*/sin δ for three asphalt binders, namely, a Control Example (Control), a Comparative Example (CEx. 1), and an Inventive Example (Ex. 1), for both an original condition sample and on those samples after being subjected to a Rolling Thin-Film Oven (RTFO) short term aging process. The dynamic shear rheometer tests were carried out according to the standard AASHTO T-315-12 test procedure.

The control example was a mixture of about 72 wt % bitumen and about 28 wt % of a gas oil, the comparative example (C1) was a mixture of about 73 wt % bitumen, about 22 wt % of a gas oil, and about 5 wt % of a base oil, and the inventive example (Ex. 1) was a mixture of about 75 wt % bitumen, about 22 wt % of a gas oil, and about 3 wt % of a mixture of one or more glycerides and one or more fatty acids (GFAM). The gas oil was a mixture of naphtha, No. 3 fuel oil, No. 4 fuel oil, No. 5 fuel oil, No. 6 fuel oil, and waxes. The base oil had an API gravity of 31.8 and a specific gravity 60/60° F. of 0.8665, measured according to ASTM D-4052-11 (Standard Test Method for Density, Relative Density, and API Gravity of Liquids by Digital Density Meter), a viscosity SUS at 100° F. of 217.2, measured according to ASTM D-445-14 (Standard Test Method for Kinematic Viscosity of Transparent and Opaque Liquids (and Calculation of Dynamic Viscosity)), and a flash point of 229° C., measured according to ASTM D-92-12b (Standard Test Method for Flash and Fire Points by Cleveland Open Cup Tester). The mixture of one or more glycerides and one or more fatty acids (GFAM) was a post-fermentation distillers corn oil recovered from a dry-grind ethanol process. The bitumen and gas oil (control), bitumen, gas oil, and base oil (C1), and bitumen, gas oil, and GFAM (Ex. 1) were blended with one another at a temperature of about 150° C. for about 10 minutes to about 20 minutes with a vertical mixer to produce the asphalt binders. The dynamic shear rheometer (DSR) results are shown in Table 1 below.

TABLE 1

|  | Control | CEx. 1 | Ex. 1 |
| --- | --- | --- | --- |
| Original DSR | Bitumen + Gas oil | Bitumen + base Oil | Bitumen + GFAM |
| Temperature (° C.) | 58 | 58 | 58 |
| G* (kPa) | 1.33 | 1.11 | 1.17 |
| δ (degrees) | 87.4 | 87.6 | 87.4 |
| G*/sin delta (kPa) | 1.33 | 1.11 | 1.17 |
| RTFO Residue DSR | Bitumen + Gas Oil | Bitumen + Base Oil | Bitumen + GFAM |
| Temperature (° C.) | 58 | 58 | 58 |
| G* (kPA) | 2.91 | 2.82 | 3.41 |
| δ (degrees) | 87.2 | 84.3 | 83.4 |
| G*/sin delta (kPa) | 2.92 | 2.83 | 3.43 |

As shown in Table 1, the Original DSR results of the three types of asphalt binder are about equal.

Example II

Asphalt binder samples, namely, 4 control examples, (Control 2-5), 4 comparative examples (CEx. 2-5), and 4 inventive examples (Ex. 2-5), were prepared and the Hamburg Rutting values were measured. The composition of three base asphalt binder grades that, depending on the particular example, were used either alone or as a component in the asphalt binders is shown in Table 2 below. The gas oil was a mixture of naphtha, No. 3 fuel oil, No. 4 fuel oil, No. 5 fuel oil, No. 6 fuel oil, and waxes.

TABLE 2

Composition of Base Asphalt Binders

| Asphalt Binder Grade | Bitumen (VTB) | Gas Oil |
|---|---|---|
| PG 64-22 | 77% | 23% |
| PG 58-28 | 72% | 28% |
| XX-34 | 56% | 44% |

The composition of each asphalt binder in the series of examples are shown in Table 3 below. The base oil had an API gravity of 31.8 and a specific gravity 60/60° F. of 0.8665, measured according to ASTM D-4052-11, a viscosity SUS at 100° F. of 217.2, measured according to ASTM D-445-14, and a flash point of 229° C., measured according to ASTM D-92-12b. The mixture of one or more glycerides and one or more fatty acids (GFAM) was a post-fermentation distillers corn oil recovered from a dry-grind ethanol process, the SBS was a styrene-butadiene-styrene block copolymer, and the PPA was a polyphosphoric acid.

The examples that included the control examples (Control 2-5) were recovered from a vacuum tower distillation unit. The comparative examples (CEx. 2-5) and the inventive examples (Ex. 2-5) were produced according to the following procedure. For each of the comparative and inventive examples a sample of the corresponding control sample was heated to approximately 185° C. in an open top container and stirred continuously with a vertical mixer. The desired amount of SBS (if used) was slowly added and allowed to melt into the bitumen over a period of about 4 hours to about 5 hours. Once the SBS polymer melted into the asphalt binder, the desired amount of prill sulfur was incorporated into the sample. The sample was continuously stirred with a vertical mixer for approximately one hour to enable the cross linking process to occur between the SBS polymer and the asphalt binder. After the prill sulfur cross linked the asphalt binder and SBS polymer, additional neat asphalt binder was added to the polymer modified asphalt binder concentrate in order to reach the desired polymer loading for the target asphalt binder performance grade. For the comparative examples, base oil was then added to the polymer modified asphalt binder in order to reach the desired low temperature performance criteria of the targeted asphalt binder performance grade. For the inventive examples, post-fermentation distillers corn oil was then added to the polymer modified asphalt binder in order to reach the desired low temperature performance criteria of the targeted asphalt binder performance grade. For some examples polyphosphoric acid (PPA) was also added at this point to increase the modulus of the polymer modified asphalt binder.

TABLE 3

Compositions of Samples used in Hamburg Rutting Testing

| Example | Final Asphalt Binder Grade | XX-34 | PG 58-28 | PG 64-22 | Base Oil | GFAM | SBS | PPA | Effective Bitumen (VTB) | Effective Gas Oil |
|---|---|---|---|---|---|---|---|---|---|---|
| Control 2 | PG 58-28 | | 100% | | | | | | 72.0% | 28.0% |
| CEx. 2 | PG 58-28 | | 95% | | 5% | | | | 73.2% | 21.9% |
| Ex. 2 | PG 58-28 | | 97% | | | 3% | | | 74.7% | 22.3% |
| Control 3 | PG 58-34 FHR-3 | 97.8% | | | | | 1.7% | 0.50% | 54.8% | 43.0% |
| CEx. 3 | PG 58-34 FHR-3 | | 93.3% | | 5% | | 1.2% | 0.50% | 67.2% | 26.1% |
| Ex. 3 | PG 58-34 FHR-3 | | 95.3% | | | 3% | 1.2% | 0.50% | 68.6% | 26.7% |
| Control 4 | PG 58-34 FHR-1 | 97.3% | | | | | 2.7% | | 54.5% | 42.8% |
| CEx. 4 | PG 58-34 FHR-1 | | 92.6% | | 5% | | 2.4% | | 66.7% | 25.9% |
| Ex. 4 | PG 58-34 FHR-1 | | 94.6% | | | 3% | 2.4% | | 68.1% | 26.5% |
| Control 5 | PG 70-34 FHR-1 | 94.7% | | | | | 5.3% | | 53.0% | 41.7% |
| CEx. 5 | PG 70-34 FHR-1 | | 90.5% | | 5% | | 4.5% | | 65.2% | 25.3% |
| Ex. 5 | PG 70-34 FHR-1 | | 92.4% | | | 3% | 4.6% | | 66.5% | 25.9% |

The Hamburg Rutting values were measured according to AASHTO T-324 at a temperature of about 50° C. The mix design utilized for the Hamburg testing was Minnesota Department of Transportation mix type SPWEB340. Table 4 provides the composite gradation for the aggregate blend as well as the specification. The asphalt binder content for this mix design was 5.5% and the minimum specification is 5.1%.

TABLE 4

Gradation for Mix Design

| Sieve Size (mm) | Composite Results (% Passing) | Minimum Specification (% Passing) | Maximum Specification (% Passing) |
|---|---|---|---|
| 19 | 100 | 100 | 100 |
| 12.5 | 94 | 85 | 100 |
| 9.5 | 82 | 35 | 90 |
| 4.75 | 64 | 30 | 80 |

TABLE 4-continued

Gradation for Mix Design

| Sieve Size (mm) | Composite Results (% Passing) | Minimum Specification (% Passing) | Maximum Specification (% Passing) |
|---|---|---|---|
| 2.36 | 51 | 25 | 65 |
| 1.18 | 39 | N/A | N/A |
| 0.6 | 26 | N/A | N/A |
| 0.3 | 14 | N/A | N/A |
| 0.15 | 6 | N/A | N/A |
| 0.075 | 3.4 | 2 | 7 |
| Voids | 4 | 3 | 5 |

The Hamburg Rutting values for these examples (Controls 2-5, CEx. 2-5, and Ex. 2-5) were measured and are shown in Table 5 below.

TABLE 5

Hamburg Rutting Test Results

| | Asphalt Binder Grade (PG) | Passes to Failure | | Maximum Rut Depth (mm) | | Average SIP |
|---|---|---|---|---|---|---|
| | | Left | Right | Left | Right | |
| Control 2 | 58-28 | 3,772 | 4,918 | 20.2 | 20.2 | 2,450 |
| CEx. 2 | 58-28 | 11,016 | 11,250 | 20.1 | 20.5 | 7,750 |
| Ex. 2 | 58-28 | 5,448 | 8,836 | 20.2 | 20.1 | 3,000 |
| Control 3 | 58-34 | 2,796 | 4,958 | 24.2 | 24.2 | 1,375 |
| CEx. 3 | 58-34 | 2,850 | 3,992 | 24.1 | 24 | 1,350 |
| Ex. 3 | 58-34 | 6,250 | 8,246 | 23.4 | 24.4 | 3,650 |
| Control 4 | 58-34 | 6,900 | 7,892 | 23.8 | 23.8 | 4,650 |
| CEx. 4 | 58-34 | 4,990 | 4,788 | 24.6 | 24.1 | 2,875 |
| Ex. 4 | 58-34 | 8,574 | 12,144 | 24.3 | 24.3 | 5,500 |
| Control 5 | 70-34 | 12,000 | 12,034 | 19.4 | 19.9 | 5,850 |
| CEx. 5 | 70-34 | 16,748 | 16,700 | 17.8 | 21.8 | 5,300 |
| Ex. 5 | 70-34 | 20,000 | 20,000 | 16.6 | 10.4 | 13,400 |

As shown in Table 5, the Hamburg Rutting test results for the inventive asphalt binders of Examples 3-5, which satisfied the PG 58-34 or the PG 70-34 requirements, all had significantly improved passes to failure values and average stripping inflection point (SIP) values as compared to the control and comparative examples. The maximum rut depth values were fairly consistent across all the examples, except that Example 5 showed a significant reduction in the maximum rut depth as compared to the control and comparative example.

Example III

To evaluate the efficacy of the mixture of one or more glycerides and one or more fatty acids (GFAM) as compared to a conventional base oil (heavy vacuum gas oil) as a blending agent to soften bitumen, different blends of petroleum crude where processed through a vacuum tower. In each case, a control asphalt (Control 6-8) were withdrawn as a softer asphalt grade. The crude was then vacuum distilled further to a harder asphalt grade than the control examples and then softened back to the grade targeted for the initial control sample with a base oil (CEx. 6-8) or a mixture of one or more glycerides and one or more fatty acids (Ex. 6-8). The base oil had an API gravity of 31.8 and a specific gravity 60/60° F. of 0.8665, measured according to ASTM D-4052-11, a viscosity SUS at 100° F. of 217.2, measured according to ASTM D-445-14, and a flash point of 229° C., measured according to ASTM D-92-12b. The mixture of one or more glycerides and one or more fatty acids (GFAM) was a post-fermentation distillers corn oil recovered from a dry-grind ethanol process. The comparative examples (CEx. 6-8) and the inventive examples (Ex. 6-8) were prepared in the same manner as the examples used in Example II discussed above.

The composition of each asphalt binder in this series of examples is shown in Table 6 below. It should be noted that the PG 58-34 asphalt binder grade is a high quality binder usually attainable only through modification with polymers or other additives. The compositions of the XX-34 and PG 58-28 are shown in Table 2 above.

TABLE 6

Compositions of Samples used in WRI

| Example | Final Asphalt Binder Grade | XX-34 | PG 58-28 | Base Oil | GFAM | SBS | PPA | Effective Bitumen (VTB) | Effective Gas Oil |
|---|---|---|---|---|---|---|---|---|---|
| Control 6 | PG 49-34 | 100% | | | | | | 56.0% | 44.0% |
| CEx. 6 | PG 49-34 | | 95.0% | 5% | | | | 68.4% | 26.6% |
| Ex. 6 | PG 49-34 | | 97.0% | | 3% | | | 69.8% | 27.2% |
| Control 7 | PG 58-34 | 97.8% | | | | 1.7% | 0.5% | 54.8% | 43.0% |
| CEx. 7 | PG 58-34 | | 93.3% | 5% | | 1.2% | 0.5% | 67.2% | 26.1% |
| Ex. 7 | PG 58-34 | | 95.3% | | 3% | 1.2% | 0.5% | 68.6% | 26.7% |
| Control 8 | PG 58-34 | 97.3% | | | | 2.7% | | 54.5% | 42.8% |
| CEx 8 | PG 58-34 | | 92.6% | 5% | | 2.4% | | 66.7% | 25.9% |
| Ex. 8 | PG 58-34 | | 94.6% | | 3% | 2.4% | | 68.1% | 26.5% |

Asphalt binder properties critical to certification and value were measured and the results are shown in Tables 6-9 below. Table 7 shows the PG Grade (high temperature) properties and the PG Grade (° C.) values are shown. The original DSR values for the PG grade (high temperature) properties were measured according to the AASHTO T-315-12 test procedure. The true PG Grade (° C.) values were calculated by determining the temperature at which the specific product's limiting factor fails a specification criteria.

TABLE 7

PG Grade (High Temperature) and PG Grade (° C.) Properties

| | | PG Grade (high temperature) | | | | PG Grade (° C.) |
|---|---|---|---|---|---|---|
| Example | Grade | ° C. | G* (kPa) | δ (degrees) | G*/sin(δ) (kPa) | ° C. |
| Control 6 | PG 49-34 | 52 | 0.868 | 88.0 | 0.87 | 48.4 |
| CEx. 6 | PG 49-34 | 52 | 0.758 | 87.9 | 0.76 | 47.3 |
| Ex. 6 | PG 49-34 | 52 | 1.060 | 87.7 | 1.07 | 50.3 |
| Control 7 | PG 58-34 | 58 | 1.310 | 77.8 | 1.34 | 58.9 |
| CEx. 7 | PG 58-34 | 58 | 1.240 | 77.1 | 1.27 | 58.2 |
| Ex. 7 | PG 58-34 | 58 | 1.380 | 77.8 | 1.38 | 59.2 |
| Control 8 | PG 58-34 | 58 | 1.470 | 73.7 | 1.53 | 60.7 |
| CEx. 8 | PG 58-34 | 58 | 1.520 | 75.5 | 1.57 | 61.0 |
| Ex. 8 | PG 58-34 | 58 | 1.610 | 76.3 | 1.65 | 61.8 |

Table 8 shows the bending beam rheometer (BBR) properties for pressure aging vessel (PAV) aged samples and the true low PG grade properties. The PAV BBR properties were measured according to the AASHTO T-313-12 test procedure. The true low PG grade properties were calculated by determining the temperature at which the BBR Stiffness and BBR Slope failed the specification criteria.

TABLE 8

PAV BBR and True Low PG Grade Properties

| | | PAV BBR | | | True Low PG Grade | | | |
|---|---|---|---|---|---|---|---|---|
| Example | Grade | ° C. | S (MPa) | m-value | Stiffness | Slope | s or m | ΔTc (° C.) |
| Control 6 | PG 49-34 | −24 | 263 | 0.340 | −35.4 | −37.7 | S | −2.3 |
| CEx. 6 | PG 49-34 | −24 | 156 | 0.348 | −39.5 | −38.4 | m | 1.1 |
| Ex. 6 | PG 49-34 | −24 | 253 | 0.337 | −35.8 | −37.4 | S | −1.6 |
| Control 7 | PG 58-34 | −24 | 254 | 0.325 | −35.8 | −36.3 | S | −0.5 |
| CEx. 7 | PG 58-34 | −24 | 184 | 0.316 | −38.4 | −35.5 | m | 2.9 |
| Ex. 7 | PG 58-34 | −24 | 262 | 0.315 | −35.5 | −35.4 | Equal | −0.1 |
| Control 8 | PG 58-34 | −24 | 252 | 0.333 | −35.8 | −37.0 | S | −1.2 |
| CEx. 8 | PG 58-34 | −24 | 203 | 0.319 | −37.7 | −35.8 | m | 1.9 |
| Ex. 8 | PG 58-34 | −24 | 264 | 0.322 | −35.4 | −36.0 | S | −0.6 |

Tables 9 and 10 show the Glover-Rowe (G-R) properties, which were measured according Report Number FHWA/TX-05/1872-2 (Federal Highway Administration and Texas Department of Transportation, 2005).

TABLE 9

Glover-Rowe Properties

| | | Glover-Rowe DSR 15° C., 0.005 rad/s | | | | | | | | |
|---|---|---|---|---|---|---|---|---|---|---|
| Example | Grade | G* (kPa) | Log G* | δ degrees | δ radians | G-R | Grade Range - S | Grade Range - m | Grade Range | Predicted Ductility |
| Control 6 | PG 49-34 | 12.03 | 1.08 | 69.69 | 1.22 | 1.5 | 83.8 | 86.1 | 83.8 | 41 |
| CEx. 6 | PG 49-34 | 16.64 | 1.22 | 64.73 | 1.13 | 3.4 | 86.8 | 85.8 | 85.8 | 29 |
| Ex. 6 | PG 49-34 | 10.21 | 1.01 | 70.23 | 1.23 | 1.2 | 86.1 | 87.7 | 86.1 | 45 |
| Control 7 | PG 58-34 | 39.71 | 1.60 | 64.93 | 1.13 | 7.9 | 94.6 | 95.2 | 94.6 | 20 |
| CEx. 7 | PG 58-34 | 87.58 | 1.94 | 55.36 | 0.97 | 34.4 | 96.6 | 93.7 | 93.7 | 10 |
| Ex. 7 | PG 58-34 | 67.65 | 1.83 | 59.49 | 1.04 | 20.2 | 94.7 | 94.6 | 94.6 | 13 |
| Control 8 | PG 58-34 | 33.08 | 1.52 | 67.21 | 1.17 | 5.4 | 96.5 | 97.7 | 96.5 | 24 |
| CEx. 8 | PG 58-34 | 58.62 | 1.77 | 60.44 | 1.05 | 16.4 | 98.8 | 96.8 | 96.8 | 14 |
| Ex. 8 | PG 58-34 | 32.60 | 1.51 | 66.02 | 1.15 | 5.9 | 97.2 | 97.8 | 97.2 | 23 |

TABLE 10

Glover Rowe Properties Continued

| Example | Grade | High PG Grade (° C.) | Low PG Grade (° C.) Stiffness | Slope | Grade Range (° C.) | Glover-Rowe (kPa) | ΔTc (° C.) |
|---|---|---|---|---|---|---|---|
| Control 6 | PG 49-34 | 48.4 | −35.4 | −37.7 | 83.8 | 1.5 | −2.3 |
| CEx. 6 | PG 49-34 | 47.3 | −39.5 | −38.4 | 85.7 | 3.4 | 1.1 |
| Ex. 6 | PG 49-34 | 50.3 | −35.8 | −37.4 | 86.1 | 1.2 | −1.6 |
| Control 7 | PG 58-34 | 58.9 | −35.8 | −36.3 | 94.7 | 7.9 | −0.5 |
| CEx. 7 | PG 58-34 | 58.2 | −38.4 | −35.5 | 93.7 | 34.4 | 2.9 |
| Ex. 7 | PG 58-34 | 59.2 | −35.5 | −35.4 | 94.6 | 20.2 | −0.1 |
| Control 8 | PG 58-34 | 60.7 | −35.8 | −37.0 | 96.5 | 5.4 | −1.2 |
| CEx. 8 | PG 58-34 | 61.0 | −37.7 | −35.8 | 96.8 | 16.4 | 1.9 |
| Ex. 8 | PG 58-34 | 61.8 | −35.4 | −36.0 | 97.2 | 5.9 | −0.6 |

As shown in Tables 7-10, for all three crude blends, both the base oil and the mixture of one or more glycerides and one or more fatty acids (GFAM) were able to restore the PG grade of the control sample. However, a better measure of quality for this parameter is the Grade Range, which represents the temperature range between the highest and lowest pavement temperatures at which the pavement can perform satisfactorily. Although the particular crude source used to provide the bitumen component of the asphalt binder is an important parameter, the use of the mixture of one or more glycerides and one or more fatty acids (GFAM) to restore the PG grade of the harder asphalt back to the softer asphalt of the control sample was equal to or better than the control, and was significantly greater than the comparative examples that used the base oil to restore the PG grade of the harder asphalt back to the softer asphalt of the control sample. As such, less asphalt modifier (mixture of one or more glycerides and one or more fatty acids versus base oil) was needed to satisfy PG grade requirements, which can significantly reduce asphalt binder production costs for equal performance.

Age-induced surface cracking (the Glover-Rowe or the G-R parameter) is an intermediate temperature measure that ranks asphalt binders with regard to the time the pavement can remain in service before surface raveling and cracking damage occurs. Lower values represent longer predicted pavement life. Inventive examples (Ex. 6-8), which used the mixture of one or more glycerides and one or more fatty acids (GFAM), had significantly better properties than the comparative examples (CEx. 6-8) that used the conventional base oil in all cases.

Age-induced surface cracking (ΔTc) ranks asphalt binders for the tendency to crack and heal at the pavement surface during the coldest winter temperature cycles. The ΔTc is calculated by determining the difference between the BBR test temperature where stiffness (S)=300 MPa and the temperature where the slope (m-value) equals 0.3. This parameter predicts the resulting damage as the binder modulus and phase angle change with aging. Lower values predict longer pavement life, whereas higher values predict early onset of damage. For all three crude sources, the inventive examples (Ex. 6-8) were far superior to the comparative examples (CEx. 6-8).

Embodiments of the present disclosure further relate to any one or more of the following paragraphs:

1. An asphalt binder, comprising: a bitumen; and a glyceride and fatty acid mixture comprising one or more triglycerides, at least 1 wt % of one or more diglycerides, and at least 5 wt % of one or more fatty acids, based on the combined weight of the one or more triglycerides, the one or more diglycerides, and the one or more fatty acids.

2. The asphalt binder according to paragraph 1, wherein the asphalt binder comprises about 1 wt % to about 25 wt % of the glyceride and fatty acid mixture, based on the combined weight of the bitumen and the glyceride and fatty acid mixture.

3. The asphalt binder according to paragraph 1, wherein the asphalt binder comprises about 1 wt % to about 5 wt % of the glyceride and fatty acid mixture, based on the combined weight of the bitumen and the glyceride and fatty acid mixture.

4. The asphalt binder according to paragraph 1, wherein the asphalt binder comprises about 3 wt % to about 15 wt % of the glyceride and fatty acid mixture, based on the combined weight of the bitumen and the glyceride and fatty acid mixture.

5. The asphalt binder according to paragraph 1, wherein the asphalt binder comprises about 10 wt % to about 22 wt % of the glyceride and fatty acid mixture, based on the combined weight of the bitumen and the glyceride and fatty acid mixture.

6. The asphalt binder according to any one of paragraphs 1 to 5, wherein the glyceride and fatty acid mixture comprises less than 90 wt % of the one or more triglycerides, based on the combined weight of the one or more triglycerides, the one or more diglycerides, and the one or more fatty acids.

7. The asphalt binder according to any one of paragraphs 1 to 5, wherein the glyceride and fatty acid mixture comprises about 72 wt % to about 88 wt % of the one or more triglycerides, based on the combined weight of the one or more triglycerides, the one or more diglycerides, and the one or more fatty acids.

8. The asphalt binder according to any one of paragraphs 1 to 5, wherein the glyceride and fatty acid mixture comprises about 74 wt % to about 86 wt % of the one or more triglycerides, based on the combined weight of the one or more triglycerides, the one or more diglycerides, and the one or more fatty acids.

9. The asphalt binder according to any one of paragraphs 1 to 5, wherein the glyceride and fatty acid mixture comprises about 74 wt % to about 80 wt % of the one or more triglycerides, based on the combined weight of the one or more triglycerides, the one or more diglycerides, and the one or more fatty acids.

10. The asphalt binder according to any one of paragraphs 1 to 5, wherein the glyceride and fatty acid mixture comprises about 80 wt % to about 86 wt % of the one or more triglycerides, based on the combined weight of the one or more triglycerides, the one or more diglycerides, and the one or more fatty acids.

11. The asphalt binder according to any one of paragraphs 1 to 10, wherein the glyceride and fatty acid mixture further comprises one or more phytosterols, and wherein the glyceride and fatty acid mixture comprises less than 1.1 wt % of one or more phytosterols, based on the combined weight of the one or more triglycerides, the one or more diglycerides, the one or more fatty acids, and the one or more phytosterols.

12. The asphalt binder according to any one of paragraphs 1 to 10, wherein the glyceride and fatty acid mixture further comprises one or more phytosterols, and wherein the glyceride and fatty acid mixture comprises about 0.9 wt % to about 1.05 wt % of the one or more phytosterols, based on the combined weight of the one or more triglycerides, the one or more diglycerides, the one or more fatty acids, and the one or more phytosterols.

13. The asphalt binder according to any one of paragraphs 1 to 12, wherein the glyceride and fatty acid mixture comprises about 74 wt % to about 88 wt % of the one or more triglycerides, at least 1 wt % to about 5 wt % of the one or more diglycerides, and about 5 wt % to about 16 wt % of the one or more fatty acids, based on the combined weight of the one or more triglycerides, the one or more diglycerides, and the one or more fatty acids.

14. The asphalt binder according to any one of paragraphs 1 to 13, wherein the glyceride and fatty acid mixture comprises about 74 wt % to about 86 wt % of the one or more triglycerides, about 3 wt % to about 5 wt % of the one or more diglycerides, and about 11 wt % to about 16 wt % of the one or more fatty acids, based on the combined weight of the one or more triglycerides, the one or more diglycerides, and the one or more fatty acids.

15. The asphalt binder according to any one of paragraphs 1 to 14, wherein the glyceride and fatty acid mixture further comprises one or more phytosterols, and wherein the glyceride and fatty acid mixture comprises about 74 wt % to about 86 wt % of the one or more triglycerides, about 3 wt % to about 5 wt % of the one or more diglycerides, about 11 wt % to about 16 wt % of the one or more fatty acids, and less than 1.05 wt % of the one or more phytosterols, based on the combined weight of the one or more triglycerides, the one or more diglycerides, the one or more fatty acids, and the one or more phytosterols.

16. The asphalt binder according to any one of paragraphs 1 to 15, wherein the bitumen comprises atmospheric tower bottoms, vacuum tower bottoms, or a mixture thereof.

17. The asphalt binder according to any one of paragraphs 1 to 16, wherein the bitumen comprises vacuum tower bottoms.

18. The asphalt binder according to any one of paragraphs 1 to 17, further comprising about 0.1 wt % to about 55 wt % of a hydrocarbon oil, based on the combined weight of the bitumen, the glyceride and fatty acid mixture, and the hydrocarbon oil, wherein the hydrocarbon oil comprises naphtha, number 3 fuel oil, number 4 fuel oil, number 5 fuel oil, number 6 fuel oil, one or more waxes, or any mixture thereof.

19. The asphalt according to any one of paragraphs 1 to 18, further comprising about 0.1 wt % to about 10 wt % of a polymer, based on the combined weight of the bitumen, the glyceride and fatty acid mixture, and the polymer.

20. The asphalt binder according to any one of paragraphs 1 to 19, further comprising about 0.01 wt % to about 1 wt % of an antistrip, based on the combined weight of the bitumen, the glyceride and fatty acid mixture, and the antistrip.

21. The asphalt binder according to any one of paragraphs 1 to 20, further comprising about 0.1 wt % to about 6 wt % of a styrene-butadiene-styrene polymer, based on the combined weight of the bitumen, the glyceride and fatty acid mixture, and the styrene-butadiene-styrene polymer.

22. The asphalt binder according to any one of paragraphs 1 to 21, wherein the glyceride and fatty acid mixture further comprises one or more phytosterols, wherein the glyceride and fatty acid mixture comprises about 74 wt % to about 86 wt % of the one or more triglycerides, about 3 wt % to about 5 wt % of the one or more diglycerides, about 5 wt % to about 16 wt % of the one or more fatty acids, and about 0.9 wt % to about 1.05 wt % of the one or more phytosterols, based on the combined weight of the one or more triglycerides, the one or more diglycerides, the one or more fatty acids, and the one or more phytosterols, and wherein the asphalt binder further comprises about 0.1 wt % to about 6 wt % of a styrene-butadiene-styrene polymer and about 0.01 wt % to about 1 wt % of an antistrip, based on the combined weight of the bitumen, the glyceride and fatty acid mixture, the styrene-butadiene-styrene polymer, and the antistrip.

23. The asphalt binder according to any one of paragraphs 1 to 22, wherein the glyceride and fatty acids mixture comprises post-fermentation distillers corn oil.

24. A method for making an asphalt binder, comprising: combining a bitumen and a glyceride and fatty acid mixture to produce an asphalt binder, wherein the glyceride and fatty acid mixture comprises one or more triglycerides, at least 1 wt % of one or more diglycerides, and at least 5 wt % of one or more fatty acids, based on the combined weight of the one or more triglycerides, the one or more diglycerides, and the one or more fatty acids.

25. The method according to paragraph 24, further comprising combining elemental sulfur with the bitumen and the glyceride and fatty acid mixture to produce the asphalt binder, wherein the elemental sulfur is combined in an amount of about 0.01 wt % to about 0.25 wt %, based on the combined weight of the bitumen, the glyceride and fatty acid mixture, and the elemental sulfur.

26. The method according to paragraph 24 or 25, further comprising combining a hydrogen sulfide scavenger with the bitumen and the glyceride and fatty acid mixture to produce the asphalt binder, wherein the hydrogen sulfide scavenger is combined in an amount of about 0.01 wt % to about 0.5 wt %, based on the combined weight of the bitumen, the glyceride and fatty acid mixture, and the hydrogen sulfide scavenger.

27. The method according to any one of paragraphs 24 to 26, wherein the asphalt binder comprises about 1 wt % to about 25 wt % of the glyceride and fatty acid mixture, based on the combined weight of the bitumen and the glyceride and fatty acid mixture.

28. The method according to any one of paragraphs 24 to 26, wherein the asphalt binder comprises about 1 wt % to about 5 wt % of the glyceride and fatty acid mixture, based on the combined weight of the bitumen and the glyceride and fatty acid mixture.

29. The method according to any one of paragraphs 24 to 26, wherein the asphalt binder comprises about 3 wt % to about 15 wt % of the glyceride and fatty acid mixture, based on the combined weight of the bitumen and the glyceride and fatty acid mixture.

30. The method according to any one of paragraphs 24 to 26, wherein the asphalt binder comprises about 10 wt % to about 22 wt % of the glyceride and fatty acid mixture, based on the combined weight of the bitumen and the glyceride and fatty acid mixture.

31. The method according to any one of paragraphs 24 to 30, wherein the glyceride and fatty acid mixture comprises less than 90 wt % of the one or more triglycerides, based on the combined weight of the one or more triglycerides, the one or more diglycerides, and the one or more fatty acids.

32. The method according to any one of paragraphs 24 to 30, wherein the glyceride and fatty acid mixture comprises about 72 wt % to about 88 wt % of the one or more triglycerides, based on the combined weight of the one or more triglycerides, the one or more diglycerides, and the one or more fatty acids.

33. The method according to any one of paragraphs 24 to 30, wherein the glyceride and fatty acid mixture comprises about 74 wt % to about 86 wt % of the one or more triglycerides, based on the combined weight of the one or more triglycerides, the one or more diglycerides, and the one or more fatty acids.

34. The method according to any one of paragraphs 24 to 30, wherein the glyceride and fatty acid mixture comprises about 74 wt % to about 80 wt % of the one or more triglycerides, based on the combined weight of the one or more triglycerides, the one or more diglycerides, and the one or more fatty acids.

35. The method according to any one of paragraphs 24 to 30, wherein the glyceride and fatty acid mixture comprises about 80 wt % to about 86 wt % of the one or more triglycerides, based on the combined weight of the one or more triglycerides, the one or more diglycerides, and the one or more fatty acids.

36. The method according to any one of paragraphs 24 to 35, wherein the glyceride and fatty acid mixture further comprises one or more phytosterols, and wherein the glyceride and fatty acid mixture comprises less than 1.1 wt % of one or more phytosterols, based on the combined weight of the one or more triglycerides, the one or more diglycerides, the one or more fatty acids, and the one or more phytosterols.

37. The method according to any one of paragraphs 24 to 35, wherein the glyceride and fatty acid mixture further comprises one or more phytosterols, and wherein the glyceride and fatty acid mixture comprises about 0.9 wt % to about 1.05 wt % of the one or more phytosterols, based on the combined weight of the one or more triglycerides, the one or more diglycerides, the one or more fatty acids, and the one or more phytosterols.

38. The method according to any one of paragraphs 24 to 37, wherein the glyceride and fatty acid mixture comprises about 74 wt % to about 88 wt % of the one or more triglycerides, at least 1 wt % to about 5 wt % of the one or more diglycerides, and about 5 wt % to about 16 wt % of the one or more fatty acids, based on the combined weight of the one or more triglycerides, the one or more diglycerides, and the one or more fatty acids.

39. The method according to any one of paragraphs 24 to 37, wherein the glyceride and fatty acid mixture comprises about 74 wt % to about 86 wt % of the one or more triglycerides, about 3 wt % to about 5 wt % of the one or more diglycerides, and about 11 wt % to about 16 wt % of the one or more fatty acids, based on the combined weight of the one or more triglycerides, the one or more diglycerides, and the one or more fatty acids.

40. The method according to any one of paragraphs 24 to 37, wherein the glyceride and fatty acid mixture further comprises one or more phytosterols, and wherein the glyceride and fatty acid mixture comprises about 74 wt % to about 86 wt % of the one or more triglycerides, about 3 wt % to about 5 wt % of the one or more diglycerides, about 11 wt % to about 16 wt % of the one or more fatty acids, and less than 1.05 wt % of the one or more phytosterols, based on the combined weight of the one or more triglycerides, the one or more diglycerides, the one or more fatty acids, and the one or more phytosterols.

41. The method according to any one of paragraphs 24 to 40, wherein the bitumen comprises atmospheric tower bottoms, vacuum tower bottoms, or a mixture thereof.

42. The method according to any one of paragraphs 24 to 41, wherein the bitumen comprises vacuum tower bottoms.

43. The method according to any one of paragraphs 24 to 42, further comprising about 0.1 wt % to about 55 wt % of a hydrocarbon oil, based on the combined weight of the bitumen, the glyceride and fatty acid mixture, and the hydrocarbon oil, wherein the hydrocarbon oil comprises naphtha, number 3 fuel oil, number 4 fuel oil, number 5 fuel oil, number 6 fuel oil, one or more waxes, or any mixture thereof.

44. The method according to any one of paragraphs 24 to 43, further comprising about 0.1 wt % to about 10 wt % of a polymer, based on the combined weight of the bitumen, the glyceride and fatty acid mixture, and the polymer.

45. The method according to any one of paragraphs 24 to 44, further comprising about 0.01 wt % to about 1 wt % of an antistrip, based on the combined weight of the bitumen, the glyceride and fatty acid mixture, and the antistrip.

46. The method according to any one of paragraphs 24 to 45, further comprising about 0.1 wt % to about 6 wt % of a styrene-butadiene-styrene polymer, based on the combined weight of the bitumen, the glyceride and fatty acid mixture, and the styrene-butadiene-styrene polymer.

47. The method according to any one of paragraphs 24 to 46, wherein the glyceride and fatty acid mixture further comprises one or more phytosterols, wherein the glyceride and fatty acid mixture comprises about 74 wt % to about 86 wt % of the one or more triglycerides, about 3 wt % to about 5 wt % of the one or more diglycerides, about 5 wt % to about 16 wt % of the one or more fatty acids, and about 0.9 wt % to about 1.05 wt % of the one or more phytosterols, based on the combined weight of the one or more triglycerides, the one or more diglycerides, the one or more fatty acids, and the one or more phytosterols, and wherein the asphalt binder further comprises about 0.1 wt % to about 6 wt % of a styrene-butadiene-styrene polymer and about 0.01 wt % to about 1 wt % of an antistrip, based on the combined weight of the bitumen, the glyceride and fatty acid mixture, the styrene-butadiene-styrene polymer, and the antistrip.

48. The method according to any one of paragraphs 24 to 47, wherein the glyceride and fatty acids mixture comprises post-fermentation distillers corn oil.

49. A method for making a paving composition, comprising: combining a plurality of solids with an asphalt binder to produce a paving composition, wherein the asphalt binder comprises a bitumen and a glyceride and fatty acid mixture, and wherein the glyceride and fatty acid mixture comprises one or more triglycerides, at least 1 wt % of one or more diglycerides, and at least 5 wt % of one or more fatty acids, based on the combined weight of the one or more triglycerides, the one or more diglycerides, and the one or more fatty acids.

50. The method according to paragraph 49, wherein the asphalt binder comprises about 1 wt % to about 25 wt % of the glyceride and fatty acid mixture, based on the combined weight of the bitumen and the glyceride and fatty acid mixture.

51. The method according to paragraph 49 or 50, wherein the asphalt binder comprises about 1 wt % to about 5 wt % of the glyceride and fatty acid mixture, based on the combined weight of the bitumen and the glyceride and fatty acid mixture.

52. The method according to paragraph 49 or 50, wherein the asphalt binder comprises about 3 wt % to about 15 wt % of the glyceride and fatty acid mixture, based on the combined weight of the bitumen and the glyceride and fatty acid mixture.

53. The method according to paragraph 49 or 50, wherein the asphalt binder comprises about 10 wt % to about 22 wt % of the glyceride and fatty acid mixture, based on the combined weight of the bitumen and the glyceride and fatty acid mixture.

54. The method according to any one of paragraphs 49 to 53, wherein the glyceride and fatty acid mixture comprises less than 90 wt % of the one or more triglycerides, based on the combined weight of the one or more triglycerides, the one or more diglycerides, and the one or more fatty acids.

55. The method according to any one of paragraphs 49 to 53, wherein the glyceride and fatty acid mixture comprises about 72 wt % to about 88 wt % of the one or more triglycerides, based on the combined weight of the one or more triglycerides, the one or more diglycerides, and the one or more fatty acids.

56. The method according to any one of paragraphs 49 to 53, wherein the glyceride and fatty acid mixture comprises about 74 wt % to about 86 wt % of the one or more triglycerides, based on the combined weight of the one or more triglycerides, the one or more diglycerides, and the one or more fatty acids.

57. The method according to any one of paragraphs 49 to 53, wherein the glyceride and fatty acid mixture comprises about 74 wt % to about 80 wt % of the one or more triglycerides, based on the combined weight of the one or more triglycerides, the one or more diglycerides, and the one or more fatty acids.

58. The method according to any one of paragraphs 49 to 53, wherein the glyceride and fatty acid mixture comprises about 80 wt % to about 86 wt % of the one or more triglycerides, based on the combined weight of the one or more triglycerides, the one or more diglycerides, and the one or more fatty acids.

59. The method according to any one of paragraphs 49 to 58, wherein the glyceride and fatty acid mixture further comprises one or more phytosterols, and wherein the glyceride and fatty acid mixture comprises less than 1.1 wt % of one or more phytosterols, based on the combined weight of the one or more triglycerides, the one or more diglycerides, the one or more fatty acids, and the one or more phytosterols.

60. The method according to any one of paragraphs 49 to 58, wherein the glyceride and fatty acid mixture further comprises one or more phytosterols, and wherein the glyceride and fatty acid mixture comprises about 0.9 wt % to about 1.05 wt % of the one or more phytosterols, based on the combined weight of the one or more triglycerides, the one or more diglycerides, the one or more fatty acids, and the one or more phytosterols.

61. The method according to any one of paragraphs 49 to 60, wherein the glyceride and fatty acid mixture comprises about 74 wt % to about 88 wt % of the one or more triglycerides, at least 1 wt % to about 5 wt % of the one or more diglycerides, and about 5 wt % to about 16 wt % of the one or more fatty acids, based on the combined weight of the one or more triglycerides, the one or more diglycerides, and the one or more fatty acids.

62. The method according to any one of paragraphs 49 to 61, wherein the glyceride and fatty acid mixture comprises about 74 wt % to about 86 wt % of the one or more triglycerides, about 3 wt % to about 5 wt % of the one or more diglycerides, and about 11 wt % to about 16 wt % of the one or more fatty acids, based on the combined weight of the one or more triglycerides, the one or more diglycerides, and the one or more fatty acids.

63. The method according to any one of paragraphs 49 to 62, wherein the glyceride and fatty acid mixture further comprises one or more phytosterols, and wherein the glyceride and fatty acid mixture comprises about 74 wt % to about 86 wt % of the one or more triglycerides, about 3 wt % to about 5 wt % of the one or more diglycerides, about 11 wt % to about 16 wt % of the one or more fatty acids, and less than 1.05 wt % of the one or more phytosterols, based on the combined weight of the one or more triglycerides, the one or more diglycerides, the one or more fatty acids, and the one or more phytosterols.

64. The method according to any one of paragraphs 49 to 63, wherein the bitumen comprises atmospheric tower bottoms, vacuum tower bottoms, or a mixture thereof.

65. The method according to any one of paragraphs 49 to 64, wherein the bitumen comprises vacuum tower bottoms.

66. The method according to any one of paragraphs 49 to 65, further comprising about 0.1 wt % to about 55 wt % of a hydrocarbon oil, based on the combined weight of the bitumen, the glyceride and fatty acid mixture, and the hydrocarbon oil, wherein the hydrocarbon oil comprises naphtha, number 3 fuel oil, number 4 fuel oil, number 5 fuel oil, number 6 fuel oil, one or more waxes, or any mixture thereof.

67. The method according to any one of paragraphs 49 to 66, further comprising about 0.1 wt % to about 10 wt % of a polymer, based on the combined weight of the bitumen, the glyceride and fatty acid mixture, and the polymer.

68. The method according to any one of paragraphs 49 to 67, further comprising about 0.01 wt % to about 1 wt % of an antistrip, based on the combined weight of the bitumen, the glyceride and fatty acid mixture, and the antistrip.

69. The method according to any one of paragraphs 49 to 68, further comprising about 0.1 wt % to about 6 wt % of a styrene-butadiene-styrene polymer, based on the combined weight of the bitumen, the glyceride and fatty acid mixture, and the styrene-butadiene-styrene polymer.

70. The method according to any one of paragraphs 49 to 69, wherein the glyceride and fatty acid mixture further comprises one or more phytosterols, wherein the glyceride and fatty acid mixture comprises about 74 wt % to about 86 wt % of the one or more triglycerides, about 3 wt % to about 5 wt % of the one or more diglycerides, about 5 wt % to about 16 wt % of the one or more fatty acids, and about 0.9 wt % to about 1.05 wt % of the one or more phytosterols, based on the combined weight of the one or more triglycerides, the one or more diglycerides, the one or more fatty acids, and the one or more phytosterols, and wherein the asphalt binder further comprises about 0.1 wt % to about 6 wt % of a styrene-butadiene-styrene polymer and about 0.01 wt % to about 1 wt % of an antistrip, based on the combined weight of the bitumen, the glyceride and fatty acid mixture, the styrene-butadiene-styrene polymer, and the antistrip.

71. The method according to any one of paragraphs 49 to 70, wherein the glyceride and fatty acids mixture comprises post-fermentation distillers corn oil.

72. The method according to any one of paragraphs 49 to 71, wherein the solids comprise sand, gravel, crushed stone, crushed concrete, crushed glass, industrial slag, or any mixture thereof.

73. A road, comprising: a plurality of solids mixed with an asphalt binder, wherein the asphalt binder comprises a bitumen and a glyceride and fatty acid mixture, and wherein the glyceride and fatty acid mixture comprises one or more triglycerides, at least 1 wt % of one or more diglycerides, and at least 5 wt % of one or more fatty acids, based on the combined weight of the one or more triglycerides, the one or more diglycerides, and the one or more fatty acids.

74. The road according to paragraph 73, wherein the asphalt binder comprises about 1 wt % to about 25 wt % of the glyceride and fatty acid mixture, based on the combined weight of the bitumen and the glyceride and fatty acid mixture.

75. The road according to paragraph 73, wherein the asphalt binder comprises about 1 wt % to about 5 wt % of the glyceride and fatty acid mixture, based on the combined weight of the bitumen and the glyceride and fatty acid mixture.

76. The road according to paragraph 73, wherein the asphalt binder comprises about 3 wt % to about 15 wt % of the glyceride and fatty acid mixture, based on the combined weight of the bitumen and the glyceride and fatty acid mixture.

77. The road according to paragraph 73, wherein the asphalt binder comprises about 10 wt % to about 22 wt % of the glyceride and fatty acid mixture, based on the combined weight of the bitumen and the glyceride and fatty acid mixture.

78. The road according to any one of paragraphs 73 to 77, wherein the glyceride and fatty acid mixture comprises less than 90 wt % of the one or more triglycerides, based on the combined weight of the one or more triglycerides, the one or more diglycerides, and the one or more fatty acids.

79. The road according to any one of paragraphs 73 to 77, wherein the glyceride and fatty acid mixture comprises about 72 wt % to about 88 wt % of the one or more triglycerides, based on the combined weight of the one or more triglycerides, the one or more diglycerides, and the one or more fatty acids.

80. The road according to any one of paragraphs 73 to 77, wherein the glyceride and fatty acid mixture comprises about 74 wt % to about 86 wt % of the one or more triglycerides, based on the combined weight of the one or more triglycerides, the one or more diglycerides, and the one or more fatty acids.

81. The road according to any one of paragraphs 73 to 77, wherein the glyceride and fatty acid mixture comprises about 74 wt % to about 80 wt % of the one or more triglycerides, based on the combined weight of the one or more triglycerides, the one or more diglycerides, and the one or more fatty acids.

82. The road according to any one of paragraphs 73 to 77, wherein the glyceride and fatty acid mixture comprises about 80 wt % to about 86 wt % of the one or more triglycerides, based on the combined weight of the one or more triglycerides, the one or more diglycerides, and the one or more fatty acids.

83. The road according to any one of paragraphs 73 to 82, wherein the glyceride and fatty acid mixture further comprises one or more phytosterols, and wherein the glyceride and fatty acid mixture comprises less than 1.1 wt % of one or more phytosterols, based on the combined weight of the one or more triglycerides, the one or more diglycerides, the one or more fatty acids, and the one or more phytosterols.

84. The road according to any one of paragraphs 73 to 83, wherein the glyceride and fatty acid mixture further comprises one or more phytosterols, and wherein the glyceride and fatty acid mixture comprises about 0.9 wt % to about 1.05 wt % of the one or more phytosterols, based on the combined weight of the one or more triglycerides, the one or more diglycerides, the one or more fatty acids, and the one or more phytosterols.

85. The road according to any one of paragraphs 73 to 84, wherein the glyceride and fatty acid mixture comprises about 74 wt % to about 88 wt % of the one or more triglycerides, at least 1 wt % to about 5 wt % of the one or more diglycerides, and about 5 wt % to about 16 wt % of the one or more fatty acids, based on the combined weight of the one or more triglycerides, the one or more diglycerides, and the one or more fatty acids.

86. The road according to any one of paragraphs 73 to 85, wherein the glyceride and fatty acid mixture comprises about 74 wt % to about 86 wt % of the one or more triglycerides, about 3 wt % to about 5 wt % of the one or more diglycerides, and about 11 wt % to about 16 wt % of the one or more fatty acids, based on the combined weight of the one or more triglycerides, the one or more diglycerides, and the one or more fatty acids.

87. The road according to any one of paragraphs 73 to 86, wherein the glyceride and fatty acid mixture further comprises one or more phytosterols, and wherein the glyceride and fatty acid mixture comprises about 74 wt % to about 86 wt % of the one or more triglycerides, about 3 wt % to about 5 wt % of the one or more diglycerides, about 11 wt % to about 16 wt % of the one or more fatty acids, and less than 1.05 wt % of the one or more phytosterols, based on the combined weight of the one or more triglycerides, the one or more diglycerides, the one or more fatty acids, and the one or more phytosterols.

88. The road according to any one of paragraphs 73 to 87, wherein the bitumen comprises atmospheric tower bottoms, vacuum tower bottoms, or a mixture thereof.

89. The road according to any one of paragraphs 73 to 88, wherein the bitumen comprises vacuum tower bottoms.

90. The road according to any one of paragraphs 73 to 89, further comprising about 0.1 wt % to about 55 wt % of a hydrocarbon oil, based on the combined weight of the bitumen, the glyceride and fatty acid mixture, and the hydrocarbon oil, wherein the hydrocarbon oil comprises naphtha, number 3 fuel oil, number 4 fuel oil, number 5 fuel oil, number 6 fuel oil, one or more waxes, or any mixture thereof.

91. The road according to any one of paragraphs 73 to 90, further comprising about 0.1 wt % to about 10 wt % of a polymer, based on the combined weight of the bitumen, the glyceride and fatty acid mixture, and the polymer.

92. The road according to any one of paragraphs 73 to 91, further comprising about 0.01 wt % to about 1 wt % of an antistrip, based on the combined weight of the bitumen, the glyceride and fatty acid mixture, and the antistrip.

93. The road according to any one of paragraphs 73 to 92, wherein the solids comprise sand, gravel, crushed stone, crushed concrete, crushed glass, industrial slag, or any mixture thereof.

94. The road according to any one of paragraphs 73 to 93, further comprising about 0.1 wt % to about 6 wt % of a styrene-butadiene-styrene polymer, based on the combined weight of the bitumen, the glyceride and fatty acid mixture, and the styrene-butadiene-styrene polymer.

95. The road according to any one of paragraphs 73 to 94, wherein the glyceride and fatty acid mixture further comprises one or more phytosterols, wherein the glyceride and fatty acid mixture comprises about 74 wt % to about 86 wt % of the one or more triglycerides, about 3 wt % to about 5 wt % of the one or more diglycerides, about 5 wt % to about 16 wt % of the one or more fatty acids, and about 0.9 wt % to about 1.05 wt % of the one or more phytosterols, based on the combined weight of the one or more triglycerides, the one or more diglycerides, the one or more fatty acids, and the one or more phytosterols, and wherein the asphalt binder further comprises about 0.1 wt % to about 6 wt % of a styrene-butadiene-styrene polymer and about 0.01 wt % to about 1 wt % of an antistrip, based on the combined weight of the bitumen, the glyceride and fatty acid mixture, the styrene-butadiene-styrene polymer, and the antistrip.

96. The road according to any one of paragraphs 73 to 95, wherein the glyceride and fatty acids mixture comprises post-fermentation distillers corn oil.

97. The asphalt binder, method, or road according to any one of paragraphs 1 to 96, wherein the asphalt binder has a complex shear modulus (G*) of about 0.1, about 0.3, about 0.5, about 0.7, about 1, about 1.3, about 1.5, about 1.7, or about 2 to about 3, about 3.3, about 3.5, about 3.7, about 4, about 4.3, about 4.5, about 4.7, or about 5 at a temperature of about 64° C.

98. The asphalt binder, method, or road according to any one of paragraphs 1 to 96, wherein the asphalt binder has a complex shear modulus (G*) of about 0.1, about 0.3, about 0.5, about 0.7, about 1, about 1.3, about 1.5, about 1.7, or about 2 to about 3, about 3.3, about 3.5, about 3.7, about 4, about 4.3, about 4.5, about 4.7, or about 5 at a temperature of about 64° C., as measured according to AASHTO T-315-12.

99. The asphalt binder, method, or road according to any one of paragraphs 1 to 98, wherein the asphalt binder, when subjected to a Rolling Thin Film Oven procedure according to AASHTO T-315-12, has a complex shear modulus (G*) of about 0.2, about 0.4, about 0.6, about 0.8, about 1, about 1.2, about 1.4, about 1.6, about 1.8, about 2, about 2.2, about 2.4, about 2.6, about 2.8, about 3, about 3.2 about 3.4, about 3.6, about 3.8, or about 4 to about 6, about 6.5, about 7, about 7.5, about 8, about 8.5, about 9, about 9.5, or about 10 at a temperature of about 64° C.

100. The asphalt binder, method, or road according to any one of paragraphs 1 to 99, wherein the asphalt binder has a PG Grade (high temperature) complex shear modulus (G*) (kPa) of about 1.0, about 1.1, or about 1.2 to about 1.3, about 1.4, about 1.5, or about 1.6 to about 1.7, about 1.8, as measured according to AASHTO T-315-12.

101. The asphalt binder, method, or road according to any one of paragraphs 1 to 100, wherein the asphalt binder has a PG Grade (high temperature) phase angle (δ) (degrees) of about 50, about 55, or about 60 to about 65, about 70, or about 75 to about 80, about 85, and about 90, as measured according to AASHTO T-315-12.

102. The asphalt binder, method, or road according to any one of paragraphs 1 to 101, wherein the asphalt binder has a PG Grade (high temperature) G*/sin(δ) (kPa) of about 1, about 1.1, or about 1.2 to about 1.3, about 1.4, about 1.5, or about 1.6 to about 1.7, about 1.8, as measured according to AASHTO T-315-12.

103. The asphalt binder, method, or road according to any one of paragraphs 1 to 102, wherein the asphalt binder has a creep stiffness (S) for a pressure aging vessel (PAV) aged asphalt binder of about 100 MPa, about 150 MPa, or about 200 MPa to about 250 MPa, about 275 MPa, or about 300 MPa, as measured according to AASHTO T-313.

104. The asphalt binder, method, or road according to any one of paragraphs 1 to 103, wherein the asphalt binder has a slope value for a pressure aging vessel (PAV) aged asphalt binder of about 0.3, about 0.31, or about 0.32 to about 0.33, about 0.34, about 0.35, about 0.36, about 0.37, or about 0.38, as measured according to AASHTO T-313.

105. The asphalt binder, method, or road according to any one of paragraphs 1 to 104, wherein the asphalt binder has a Glover-Rowe (kPa) for a pressure aging vessel (PAV) aged asphalt binder of about 1, about 5, about 10, or about 15 to about 20, about 25, about 30, about 35, or about 106. The asphalt binder, method, or road according to any one of paragraphs 1 to 105, wherein the asphalt binder has an age-induced surface cracking (ΔTc) for a pressure aging vessel (PAV) aged asphalt binder of about −3, about −2.5, about −2, or about −1.5 to about −1.0, about −0.5, about 0, about 0.5, about 1, about 1.5, about 2, about 2.5, about 3, or about 3.5.

107. The asphalt binder, method, or road according to any one of paragraphs 1 to 106, wherein the asphalt binder has an age-induced surface cracking (ΔTc) for a pressure aging vessel (PAV) aged asphalt binder of less than 3.5, less than 3.3, less than 3, less than 2.7, less than 2.5, less than 2.3, less than 2, less than 1.7, less than 1.5, less than 1.3, less than 1, less than 0.7, less than 0.5, less than 0.3, less than 0, less than −0.3, less than −0.5, less than −0.7, less than −1, less than −1.3, less than −1.5, less than −1.7, less than −2, or less than −2.2.

108. The asphalt binder, method, or road according to any one of paragraphs 1 to 96, wherein the asphalt binder meets product specifications for XX-34, PG 46-34, PG 46-40, PG 49-34, PG 49-40, PG 52-34, PG 52-34 CIR, PG 52-40, PG 58-34, PG 58-40, PG 64-34, PG 64-40, PG 70-34, PG 70-40, PG 58-28, PG 64-28, PG 70-28, PG 76-28, PG 64S-28, PG 64H-28, PG 64V, or PG 64E-28, PG 64S-22, PG 64H-22, PG 64V-22, PG 64E-22, PG 58S-28, PG 58H-28, PG 58V-28, PG 58E-28, PG 58S-22, PG 58H-22, PG 58V-22, PG 58E-22, PG 52S-34, PG 52H-34, PG 52V-34, PG 52E-34, PG 52S-34, PG 52H-34, PG 52V-34, PG 46S-34, PG 46H-34, PG 46V-34, PG 46E-34, PG 46S-40, PG 46H-40, PG 46V-40, or PG 46E-40, as measured according to AASHTO M320 and AASHTO M332.

109. The method according to any one of paragraphs 44, 46, 47, 67, 69, or 70, wherein the polymer is combined with the bitumen and the glyceride and fatty acid mixture under high shear conditions in a time of less than 60 minutes.

110. The method according to any one of paragraphs 44, 46, 47, 67, 69, or 70, wherein the polymer is combined with the bitumen and the glyceride and fatty acid mixture under high shear conditions in a time of about 15 minutes to about 55 minutes.

111. The method according to any one of paragraphs 44, 46, 47, 67, 69, or 70, wherein the polymer is combined with the bitumen and the glyceride and fatty acid mixture under low shear conditions in a time of about 120 minutes to about 300 minutes.

112. The method according to any one of paragraphs 44, 46, 47, 67, 69, or 70, wherein the polymer is combined with the bitumen and the glyceride and fatty acid mixture under low shear conditions in a time of about 120 minutes to about 230 minutes.

113. The asphalt binder, method, or road according to any one of paragraphs 1 to 112, wherein the glyceride and fatty acid mixture comprises a post-fermentation distillers corn oil.

114. The asphalt binder, method, or road according to any one of paragraphs 1 to 112, wherein the glyceride and fatty acid mixture consists essentially of comprises a post-fermentation distillers corn oil.

115. The asphalt binder, method, or road according to any one of paragraphs 1 to 112, wherein the glyceride and fatty acid mixture consists of a post-fermentation distillers corn oil.

116. An asphalt binder, comprising: a bitumen; and a mixture comprising one or more glycerides and one or more fatty acids, wherein the mixture comprises one or more triglycerides, at least 1 wt % of one or more diglycerides, and at least 5 wt % of one or more fatty acids, based on the combined weight of the one or more triglycerides, the one or more diglycerides, and the one or more fatty acids.

117. An asphalt binder, comprising: a bitumen; and a mixture comprising one or more triglycerides, at least 1 wt % of one or more diglycerides, and at least 5 wt % of one or more fatty acids, based on the combined weight of the one or more triglycerides, the one or more diglycerides, and the one or more fatty acids in the mixture.

118. A method for making an asphalt binder, comprising: combining a bitumen and a mixture comprising one or more glycerides and one or more fatty acids to produce an asphalt binder, wherein the mixture comprises one or more triglycerides, at least 1 wt % of one or more diglycerides, and at least 5 wt % of one or more fatty acids, based on the combined weight of the one or more triglycerides, the one or more diglycerides, and the one or more fatty acids.

119. A method for making an asphalt binder, comprising: combining a bitumen and a mixture comprising one or more triglycerides, at least 1 wt % of one or more diglycerides, and at least 5 wt % of one or more fatty acids, based on the combined weight of the one or more triglycerides, the one or more diglycerides, and the one or more fatty acids.

120. A method for making a paving composition, comprising: combining a plurality of solids with an asphalt binder to produce a paving composition, wherein the asphalt binder comprises a bitumen and a mixture comprising one or more glycerides and one or more fatty acids, and wherein the mixture comprises one or more triglycerides, at least 1 wt % of one or more diglycerides, and at least 5 wt % of one or more fatty acids, based on the combined weight of the one or more triglycerides, the one or more diglycerides, and the one or more fatty acids.

121. A method for making a paving composition, comprising: combining a plurality of solids with an asphalt binder to produce a paving composition, wherein the asphalt binder comprises a bitumen and a mixture comprising one or more triglycerides, at least 1 wt % of one or more diglycerides, and at least 5 wt % of one or more fatty acids, based on the combined weight of the one or more triglycerides, the one or more diglycerides, and the one or more fatty acids.

122. A road, comprising: a plurality of solids mixed with an asphalt binder, wherein the asphalt binder comprises a bitumen and a mixture comprising one or more glycerides and one or more fatty acids, and wherein the mixture comprises one or more triglycerides, at least 1 wt % of one or more diglycerides, and at least 5 wt % of one or more fatty acids, based on the combined weight of the one or more triglycerides, the one or more diglycerides, and the one or more fatty acids.

123. A road, comprising: a plurality of solids mixed with an asphalt binder, wherein the asphalt binder comprises a bitumen and a mixture comprising one or more triglycerides, at least 1 wt % of one or more diglycerides, and at least 5 wt % of one or more fatty acids, based on the combined weight of the one or more triglycerides, the one or more diglycerides, and the one or more fatty acids.

124. The method or road according to any one of paragraphs 120 to 123, wherein the plurality of solids comprises sand, gravel, crushed stone, crushed concrete, crushed glass, industrial slag, or any mixture thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An asphalt binder, comprising:
a bitumen; and
a glyceride and fatty acid mixture comprising about 60 wt % to about 92 wt % of one or more triglycerides, at least 1 wt % of one or more diglycerides, and at least 5 wt % of one or more free fatty acids, based on the combined weight of the one or more triglycerides, the one or more diglycerides, and the one or more free fatty acids.

2. The asphalt binder of claim 1, wherein the asphalt binder comprises about 1 Wt % to about 25 wt % of the glyceride and fatty acid mixture, based on the combined weight of the bitumen and the glyceride and fatty acid mixture.

3. The asphalt binder of claim 1, wherein the glyceride and fatty acid mixture comprises about 60 wt % to 90 wt % of the one or more triglycerides, based on the combined weight of the one or more triglycerides, the one or more diglycerides, and the one or more free fatty acids.

4. The asphalt binder of claim 1, wherein the glyceride and fatty acid mixture comprises about 72 wt % to about 88 wt % of the one or more triglycerides, based on the combined weight of the one or more triglycerides, the one or more diglycerides, and the one or more free fatty acids.

5. The asphalt binder of claim 1, wherein the glyceride and fatty acid mixture further comprises one or more phytosterols, and wherein the glyceride and fatty acid mixture comprises less than 1.1 wt % of one or more phytosterols, based on the combined weight of the one or more triglycerides, the one or more diglycerides, the one or more free fatty acids, and the one or more phytosterols.

6. The asphalt binder of claim 1, wherein the glyceride and fatty acid mixture further comprises one or more phytosterols, and wherein the glyceride and fatty acid mixture comprises about 0.9 wt % to about 1.05 wt % of the one or more phytosterols, based on the combined weight of the one or more triglycerides, the one or more diglycerides, the one or more free fatty acids, and the one or more phytosterols.

7. The asphalt binder of claim 1, wherein the glyceride and fatty acid mixture comprises about 74 wt % to about 86 wt % of the one or more triglycerides, about 3 wt % to about 5 wt% of the one or more diglycerides, and about 11 w t% to about 16 wt % of the one or more free fatty acids, based on the combined weight of the one or more triglycerides, the one or more diglycerides, and the one or more free fatty acids.

8. The asphalt binder of claim 1, wherein the glyceride and fatty acid mixture further comprises one or more phytosterols, and wherein the glyceride and fatty acid mixture comprises about 74 wt % to about 86 wt % of the one or more triglycerides, about 3 wt % to about 5 wt % of the one or more diglycerides, about 5 wt% to about 16 wt% of the one or more free fatty acids, and less than 1.05 wt% of the one or more phytosterols, based on the combined weight of the one or more triglycerides, the one or more diglycerides, the one or more free fatty acids, and the one or more phytosterols.

9. The asphalt binder of claim 1, wherein the bitumen comprises atmospheric tower bottoms, vacuum tower bottoms, or a mixture thereof.

10. The asphalt binder of claim 1, wherein the bitumen comprises vacuum tower bottoms.

11. The asphalt binder of claim 1, wherein the glyceride and fatty acid mixture has an iodine value of about 115 to about 130, as measured according to AOAC 920.158-1920 (1998).

12. The asphalt binder of claim 1, wherein the glyceride and fatty acid mixture is post-fermentation distillers corn oil.

13. The asphalt binder of claim 1, further comprising about 0.1 wt% to about 10 wt% of a polymer, based on the combined weight of the bitumen, the glyceride and fatty acid mixture, and the polymer.

14. The asphalt binder of claim 1, further comprising about 0.01 wt % to about 1 wt % of an antistrip, based on the combined weight of the bitumen, the glyceride and fatty acid mixture, and the antistrip.

15. The asphalt binder of claim 1, further comprising about 0.1 wt % to about 6 wt % of a styrene-butadiene-styrene polymer, based on the combined weight of the bitumen, the glyceride and fatty acid mixture, and the styrene-butadiene-styrene polymer.

16. The asphalt binder of claim 1, wherein the glyceride and fatty acid mixture further comprises one or more phytosterols, wherein the glyceride and fatty acid mixture comprises about 74 wt % to about 86 wt % of the one or more triglycerides, about 3 wt % to about 5 wt % of the one or more diglycerides, about 5 wt % to about 16 wt% of the one or more free fatty acids, and about 0.9 wt % to about 1.05 wt % of the one or more phytosterols, based on the combined weight of the one or more triglycerides, the one or more diglycerides, the one or more free fatty acids, and the one or more phytosterols, and wherein the asphalt binder further comprises about 0.1 wt % to about 6 wt % of a styrene-butadiene-styrene polymer and about 0.01 wt% to about 1 wt % of an antistrip, based on the combined weight of the bitumen, the glyceride and fatty acid mixture, the styrene-butadiene-styrene polymer, and the antistrip.

17. A method for making an asphalt binder, comprising:
combining a bitumen and a glyceride and fatty acid mixture to produce an asphalt binder, wherein the glyceride and fatty acid mixture comprises about 60 wt % to about 92 wt % of one or more triglycerides, at least 1 wt % of one or more diglycerides, and at least 5 wt % of one or more free fatty acids, based on the combined weight of the one or more triglycerides, the one or more diglycerides, and the one or more free fatty acids.

18. The method of claim 17, further comprising combining elemental sulfur with the bitumen and the glyceride and fatty acid mixture to produce the asphalt binder, wherein the elemental sulfur is combined in an amount of about 0.01 wt % to about 0.25 wt %, based on the combined weight of the bitumen, the glyceride and fatty acid mixture, and the elemental sulfur.

19. The method of claim 17, further comprising combining a hydrogen sulfide scavenger with the bitumen and the glyceride and fatty acid mixture to produce the asphalt binder, wherein the hydrogen sulfide scavenger is combined in an amount of about 0.01 wt % to about 0.5 wt %, based on the combined weight of the bitumen, the glyceride and fatty acid mixture, and the hydrogen sulfide scavenger.

20. A method for making a paving composition, comprising:
combining a plurality of solids with an asphalt binder to produce a paving composition, wherein the asphalt binder comprises a bitumen and a glyceride and fatty acid mixture, and wherein the glyceride and fatty acid mixture comprises about 60 wt % to about 92 wt % of one or more triglycerides, at least 1 wt % of one or more diglycerides, and at least 5 wt % of one or more free fatty acids, based on the combined weight of the one or more triglycerides, the one or more diglycerides, and the one or more free fatty acids.

21. The method of claim 20, wherein the plurality of solids comprises sand, gravel, crushed stone, crushed concrete, crushed glass, industrial slag, or any mixture thereof.

22. An asphalt binder, comprising:
a bitumen; and
about 1 wt % to about 25 wt % of a post-fermentation distillers corn oil, based on a combined weight of the bitumen and the post-fermentation distillers corn oil, wherein the post-fermentation distillers corn oil comprises about 74 wt % to about 86 wt % of triglycerides, about 3 wt % to about 5 wt % of diglycerides, and about 11 wt % to about 16 wt % of free fatty acids, based on the combined weight of the triglycerides, the diglycerides, and the free fatty acids.

23. The asphalt of claim 22, wherein the bitumen comprises atmospheric tower bottoms, vacuum tower bottoms, or a mixture thereof.

24. The asphalt binder of claim 23, further comprising about 0.1 wt % to about 55 wt % of a hydrocarbon oil, based on the combined weight of the bitumen, the glyceride and fatty acid mixture, and the hydrocarbon oil.

25. The asphalt binder of claim 24, further comprising about 0.1 wt % to about 6 wt % of a styrene-butadiene-styrene polymer, based on the combined weight of the bitumen, the glyceride and fatty acid mixture, and the styrene-butadiene-styrene polymer.

26. The asphalt binder of claim 25, further comprising combining elemental sulfur with the bitumen and the glyceride and fatty acid mixture to produce the asphalt binder, wherein the elemental sulfur is combined in an amount of about 0.01 wt % to about 0.25 wt %, based on the combined weight of the bitumen, the glyceride and fatty acid mixture, and the elemental sulfur.

* * * * *